(12) United States Patent
Lauder et al.

(10) Patent No.: US 6,253,238 B1
(45) Date of Patent: Jun. 26, 2001

(54) INTERACTIVE CABLE TELEVISION SYSTEM WITH FRAME GRABBER

(75) Inventors: Gary M. Lauder, New York, NY (US); W. Leo Hoarty, Morgan Hill, CA (US)

(73) Assignee: ICTV, Inc., Los Gatos, CA (US)

( * ) Notice: Subject to any disclaimer, the term of this patent is extended or adjusted under 35 U.S.C. 154(b) by 0 days.

(21) Appl. No.: 09/203,944

(22) Filed: Dec. 2, 1998

(51) Int. Cl.[7] .............................. H04N 7/10; H04N 7/14; H04N 7/173
(52) U.S. Cl. .................................. 709/217; 348/7; 348/12; 348/13; 725/114; 725/116; 725/118; 725/120
(58) Field of Search .................................. 348/7, 12, 13, 348/22, 572; 345/328; 709/217, 213, 216, 231; 725/114, 116, 118, 144, 146, 148

(56) References Cited

U.S. PATENT DOCUMENTS

| | | | |
|---|---|---|---|
| 4,924,303 | * | 5/1990 | Brandone et al. ..................... 358/86 |
| 5,262,860 | * | 11/1993 | Fitzpatrich et al. .................. 358/142 |
| 5,539,449 | * | 7/1996 | Blahut et al. ........................... 725/93 |
| 5,649,283 | * | 7/1997 | Galler et al. .............................. 455/2 |
| 5,748,234 | * | 5/1998 | Lippincott ............................ 348/222 |
| 5,822,537 | * | 10/1998 | Katseff et al. ................... 395/200.61 |
| 5,828,371 | * | 10/1998 | Cline et al. ........................... 345/328 |
| 6,049,831 | * | 4/2000 | Gardell et al. ....................... 709/236 |

* cited by examiner

*Primary Examiner*—Andrew Faile
*Assistant Examiner*—Krista Bui
(74) *Attorney, Agent, or Firm*—Bromberg & Sunstein LLP

(57) ABSTRACT

In an interactive cable system having at least one processor at a headend in communication with subscribers through an information service distribution network, a frame grabber is provided for grabbing a frame of video and storing the frame in a storage medium. A video frame may be requested from the storage medium in response to control data received from a subscriber selection device, wherein a processor retrieves the video frame from the storage medium, transforms the frame into a television information signal and sends the frame to the subscriber's home interface controller for display on the subscriber's television.

15 Claims, 22 Drawing Sheets

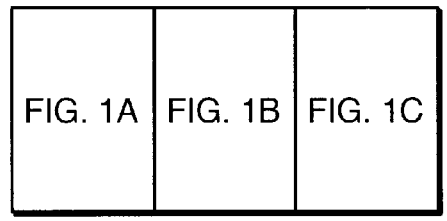
FIG. 1
FIG. 1A
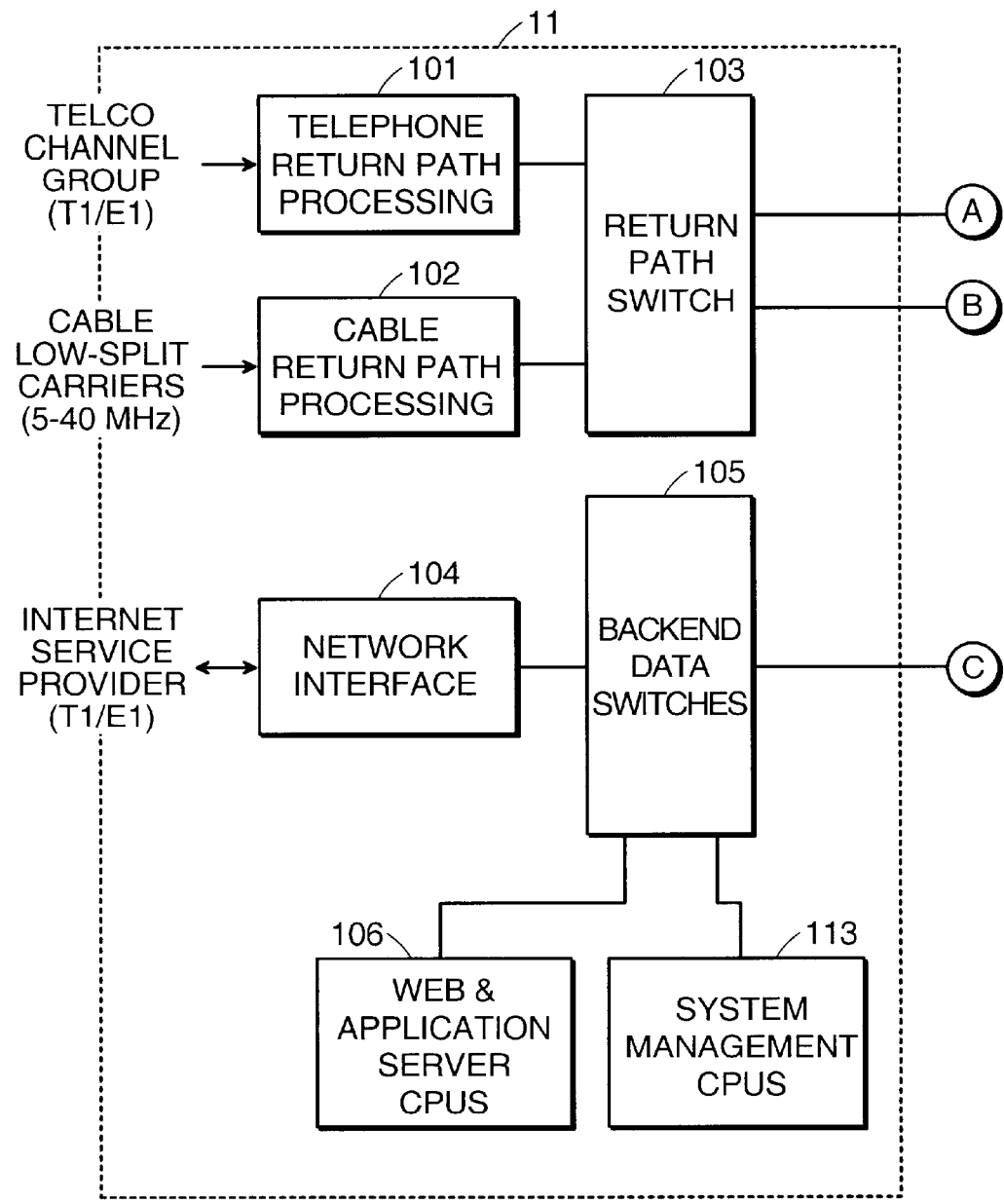

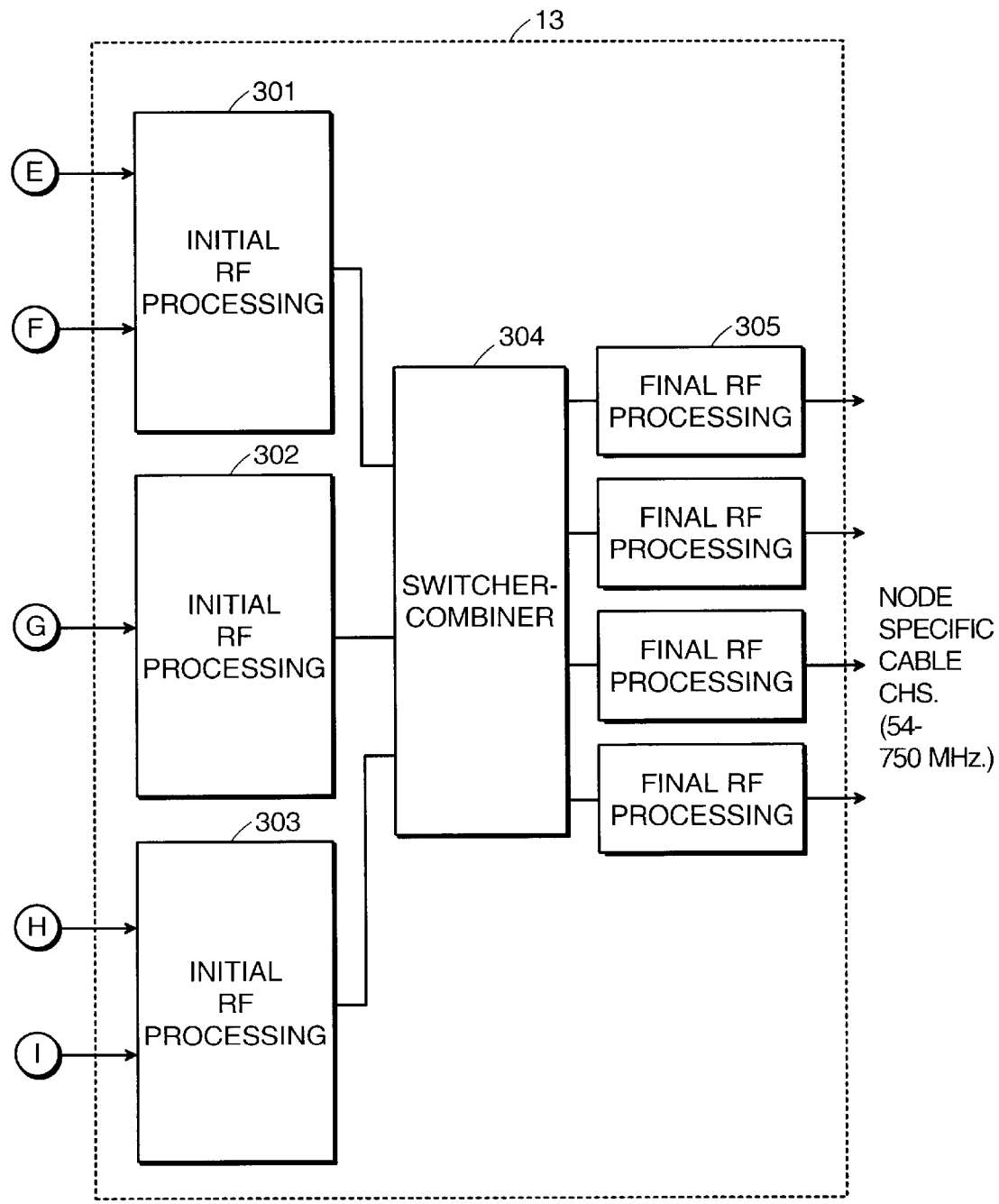

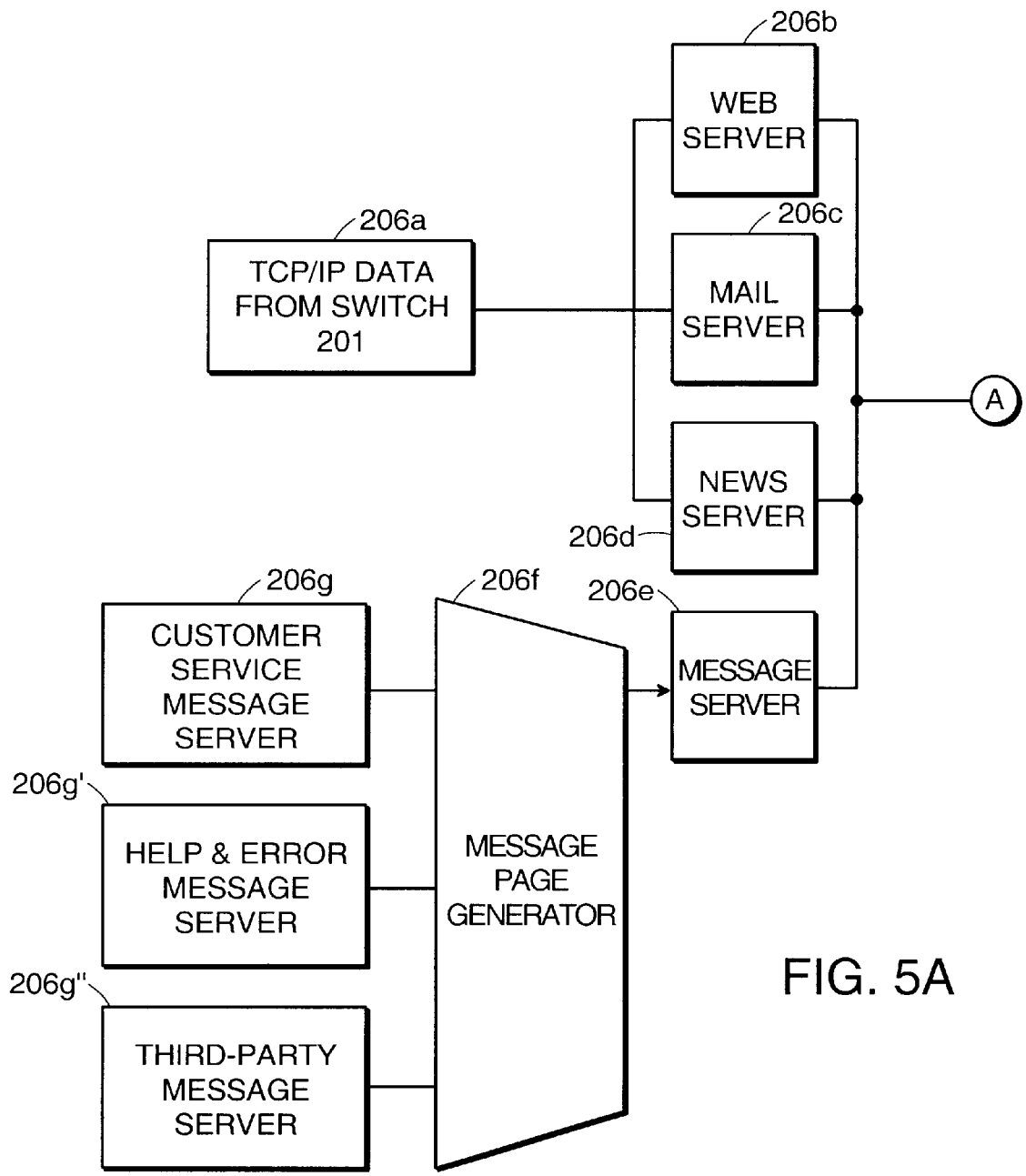

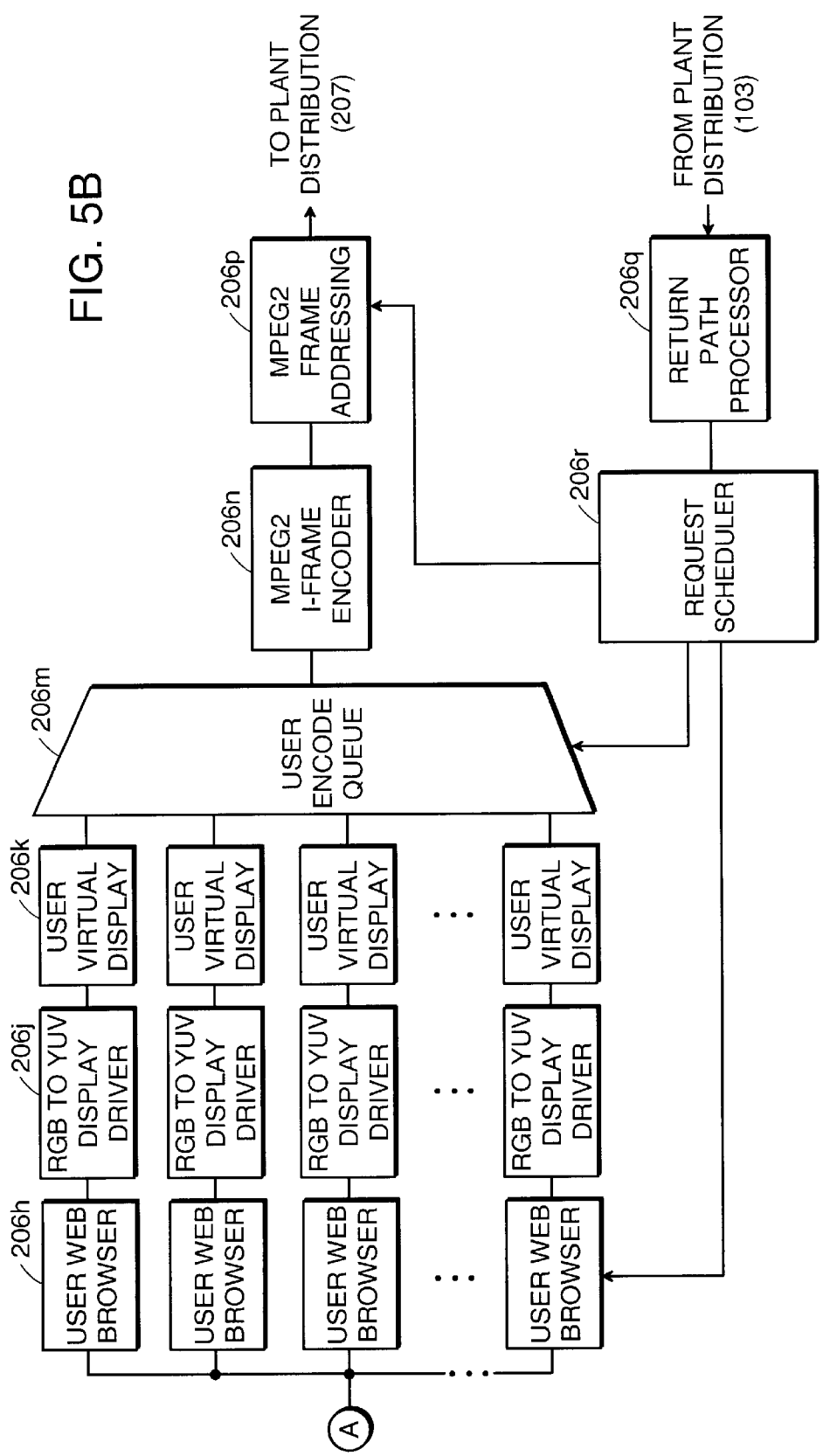

INTERACTIVE CABLE TELEVISION SYSTEM WITH FRAME GRABBER

FIELD OF INVENTION

This invention relates to cable television systems, particularly those providing private channels on demand to users for interactive-type services.

BACKGROUND ART

Bandwidth problems have long restricted the ability of cable television systems to provide private information services to subscribers. Such information services may include Internet access, video-on-demand, games, catalogs, etc. Private services may also include allowing the user to select from among hundreds of less popular programming that is thus made available only on a demand basis. One solution to the limits on system bandwidth has been to assign a portion of cable system bandwidth to conventional or popular channels that are universally broadcast to all subscribers. The remaining available channels are then available for assignment to requesting subscribers on a demand basis.

One such system for providing interactive services on a demand basis is described in U.S. Pat. No. 5,550,578. The full disclosure of this reference is hereby incorporated by reference herein. Basically the cable service distribution network divides the subscriber pool into various service areas, each served by a different trunk. A first group of channels broadcast to all service areas may provide conventional channels on channels 2 to 73 for example. A second group of channels, 74 to 79, for example, may be reserved for private information services. While the information on channels 2 to 73 is the same in each service area, the information on channels 74 to 79 is different in each service area. Of these channels, those that are in use are individually assigned to requesting subscribers. Subscribers receiving analog signals will use a full channel, those receiving digital signals will share the assigned channel with other subscribers on a packet addressed or time shared basis. A subscriber in one service area may be interacting on channel 74 at the same time a different subscriber in a different service area was also assigned to channel 74. The headend is equipped with the necessary processing, switching or splitting and combining systems for setting up these private channels on demand. Once assigned a channel for interactive services, the subscriber can request from any of a number of interactive services. Different interactive services may be accessed by the user requesting a different channel. For example, channels 80 to 300 can be virtual channels each of which accesses a different interactive service. As the subscriber continues to change channels among the interactive alternatives, the program being watched will change but the subscriber will remain tuned to the assigned channel for receiving interactive services. The information services can thus be provided to a subscriber over virtual channels in which the channel number changes for different interactive information services, even though the various information services may be provided over a fixed frequency input to the set top. The control data from the subscriber's set top can cause the back end to supply a different information service as the subscriber appears to be changing the channel.

Subscribers receive these interactive channels in a real time manner. If accessing a World Wide Web page in an interactive service a subscriber wishes to save the page, typically a video cassette recorder or printer attached to the set top would be required.

SUMMARY OF THE INVENTION

The present invention is directed to an interactive cable system in which a frame grabber is included in the headend. Each subscriber television on the interactive system is associated with a home interface controller. A subscriber selection device permits subscriber interaction through the home interface controller.

In one embodiment, the frame grabber is controlled by a processor in response to control data received from the given home interface controller. The frame grabber grabs a selected frame of video input and produces an output frame. The frame grabber communicates with the processor and transfers the output frame to a storage medium. Control data from a home interface controller may request that the output frame be retrieved from the storage medium.

In another embodiment of the invention, the storage medium is a digital storage medium and the output frame is a digital output frame. In response to a request by a subscriber using the subscriber selection device, the processor retrieves the digital output frame from the storage medium, transforms the digital output frame into an analog output frame, and sends the frame to the subscriber's home interface controller for display on the subscriber television.

In another embodiment, a video mixer controlled by the processor in response to control data received from the given home interface controller is part of the system. The video mixer produces an output signal combining video received from a first television signal input with video received on a second television signal input to produce a television signal for displaying a video image in which the video from the second television signal input is overlaid on the video from the first television signal input. In another embodiment, a character recognition program is added to the processor for recognizing any text from the output frame and extracting the text creating a stored frame and sending the stored frame to the storage medium. Additionally, the character recognition program recognizes a URL address, and extracts the address into a URL frame and sends the URL frame to the storage medium for later retrieval by a subscriber. The URL address may be located in the vertical blanking interval of the output frame.

If requested by a subscriber the frame grabber may be used to retrieve and store multiple frames, so that a video clip may be saved from the television signal or from other sources.

Other objects and advantages of the present invention will become apparent during the following description of the presently preferred embodiments of the present invention taken in conjunction with the drawings.

BRIEF DESCRIPTION OF THE DRAWINGS

FIG. 5 is a block diagram of a frame server for use in the headend of FIG. 1.

DETAILED DESCRIPTION OF SPECIFIC EMBODIMENTS

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, cable television systems using fiber optics and mixed fiber optic-coaxial cable, as well as other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, Internet access, local origination service, community event service, regular broadcast service, etc. "Television communication" means providing an information service via a television information signal. A "television information signal" is any signal that may be utilized by a television for video display, regardless of the form, including a standard NTSC-modulated rf carrier, an MPEG-compressed digital data stream, or any other format. "Interactive television service" means an information service that utilizes an interface affording two-way communication with a facility of the cable provider. When a home interface controller is said to be in an "interactive mode," it means that the interactive television information system is providing an information service to the home interface controller. "Interactive pages" are defined herein to include still video frame images or a multimedia short script for interpretation by a local process such as a typical page of HTML data as practiced by conventional web browsers. Thus the interactive page may show cursor movement or flashing or revolving images under local process control. An interactive page is typically sent intermittently from the frame server. It does not require the frame server to continually send video information multiple times a second.

A cable television system comprises a headend and distribution plant. The cable distribution plant includes a cable distribution network having bridger amplifiers, feeders, feeder amplifiers, and cable drops serving homes.

Figure 1B:
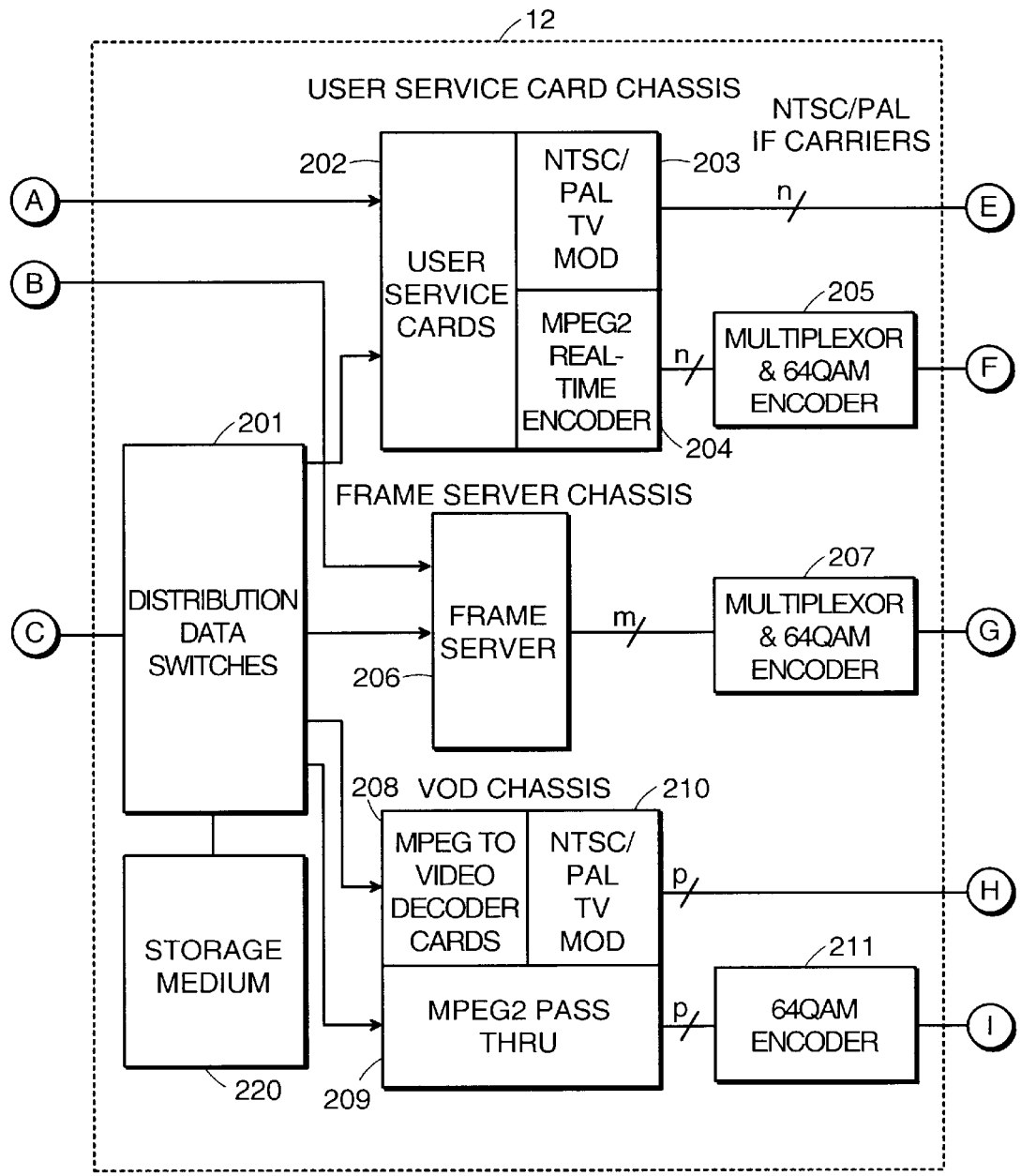
FIG. 1 is a block diagram of a headend for an embodiment of the present invention.

Referring now to FIG. 1, a headend is illustrated for providing interactive services. The headend includes back end 11, front end 12, and switching output RF hub 13. Data communication from subscribers is delivered thru a return data path to the back end 11 of the headend. One alternative return path is through telephone lines to telephone return path processing block 101. Another alternative return path is through a reserved frequency band throughout the cable network. For example, the 5–40 MHZ band may be reserved for data communication from subscribers to the headend. Cable return path processing block 102 is in communication with such signals provided over a cable return path. Telephone return path processing 101 and cable return path processing 102 are connected through return path switches 103 with user service cards 202 and frame server 206. The user service cards 202 each contain a processor that acts as an interactive controller which is individually assignable to a requesting subscriber on a demand basis. The interactive controller receives the data from its assigned subscriber and produces the information to be delivered to the subscriber in a television signal. The frame server 206 is one or more processors which interface with a plurality of subscribers. Processes running on the frame server 206 may be individually assigned to subscribers or may handle interactions with a plurality of requesting subscribers. Each interactive process on the frame server 206 responds to data from a subscriber and produces the information to be delivered to the subscriber in the form of a television signal.

The back end 11 further provides information sources to the front end 12. A network interface 104 is in communication with an Internet service provider. Back end switches 105 are in communication with the network interface 104 and web and application server CPU's 106 as well as system management CPUs 113. Communications are completed with the front end 12 through back end switches 105 via distribution switches 201. Because the user service cards in a preferred embodiment are diskless and lack operating system software necessary for bootup, server 106 may also provide booting-up for the interactive controllers. Also, server 106 provides a web proxy server function so that information downloaded from a remote server on the Internet is quickly cached on server 106.

Distribution switches 201 provide communication signals and control signals to the user service cards 202, the frame server 206, MPEG to video decoder cards 208 and MPGE2 pass thru 209. MPEG and MPGE2 digital encoding schemes are referred to herein by example only. Those of ordinary skill in the art should readily recognize that the present invention may be practiced with other currently available and later developed schemes for delivering video information through digital signals. The user service cards may be dedicated to any of a variety of interactive services. For example, there may be Internet service cards for running web browser processes and other video game player cards for running video game processes. The MPEG-to-video decoder cards 208 and the MPEG2 pass thru 209 are for providing video to subscribers on demand.

NTSC/PAL TV modulator cards 203 provide analog television signals from the outputs of the user service cards 202. The television signals are in the form of NTSC or PAL IF (intermediate frequency) signals. NTSC/PAL TV modulator cards 210 are also provided for providing video on demand on analog signals. The analog signals from the user card chassis NTSC/PAL TV modulators 203 and the video on demand NTSC/PAL TV modulators 210 are provided to initial RF processing 301 and 303, respectively, in the switching output RF hub 13. The initial RF processing includes upconverting the NTSC/PAL IF carrier signals onto a frequency determined by the channel frequency assigned to the subscriber destination. Channel assignment and control of any adjustable upconverters is handled by system management CPUs 113 which are in communication with the switching output RF hub 13 through communication lines not shown. In a presently preferred embodiment, a user service card 202, an NTSC/PAL modulator 203 and an upconverter may all be packaged in a single module. The module as a whole would be assigned to a requesting subscriber.

MPGE2 real time encoders 204 provide digital television signals from the outputs of the user service cards 202. The frame server 206 includes an MPEG encoder to provide digital television signals as well. Videos may be stored in MPEG format and may therefor use pass thru 209 to directly provide digital television signals. The digital signals are combined into a composite 64 QAM (quadrature amplitude modulation) signal before going to initial RF processing. The digital signals are multiplexed so that many different signals may be carried on a single analog carrier. Multiplexer and 64 QAM encoder 205 receives signals from the user chassis' MPGE2 real time encoders 204. Multiplexer and 64 QAM encoder 207 receives signals from the frame server 206. 64 QAM encoder 211 handles the video signals from the video on demand chassis. Within switching output RF hub 13, initial RF processing 301, 302, 303 is performed in which there is one RF module per simultaneous user. The output of RF processing 301,302,303 is switched for delivery to the service area of each respective subscriber destination and all signals going to a particular service area are combined via switcher-combiner 304. The combined signals for each service area pass through a final RF processing 305.

Figure 2:
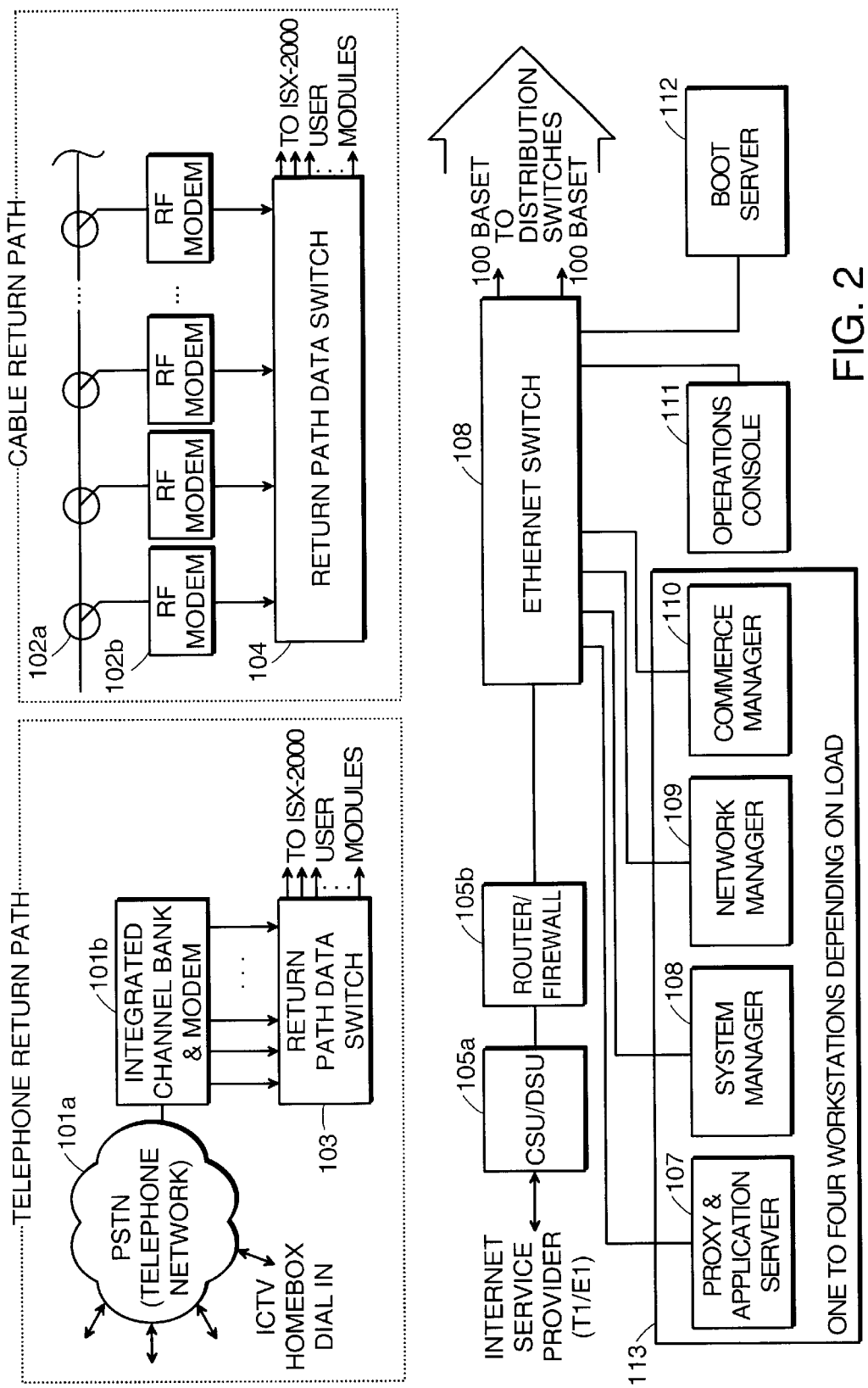
FIG. 2 is a block diagram of a back end for use in the headend of FIG. 1.

An embodiment of back end 11 is shown in more detail in FIG. 2. Cable return path processing 102 is provided by a bank of RF modems 102b. Splitters 102a extract cable signals for processing by the RF modems 102b. Telephone return path processing 101 is provided through the public service telephone network 101a to an integrated channel bank and modem 101b. Network interface 104 is provided by router firewall 105b and CSU/DSU (customer service unit/data service unit) 105a. Router firewall 105b is in communication with Ethernet switch 108. Also shown in FIG. 2 are web proxy and application server 107, system manager 108, network manager 109 and commerce manager 110 in communication with Ethernet switch 108. System manager 108 provides for the allocation of resources to permit interactive services with a user, as well as procedures for call set-up and tear down. Commerce manager 110 manages real-time transactions and converts billing to a batch format for handling by legacy systems. Also shown in FIG. 2 are operations console 111 and boot server 112 in communication with Ethernet switch 108.

Figure 3:
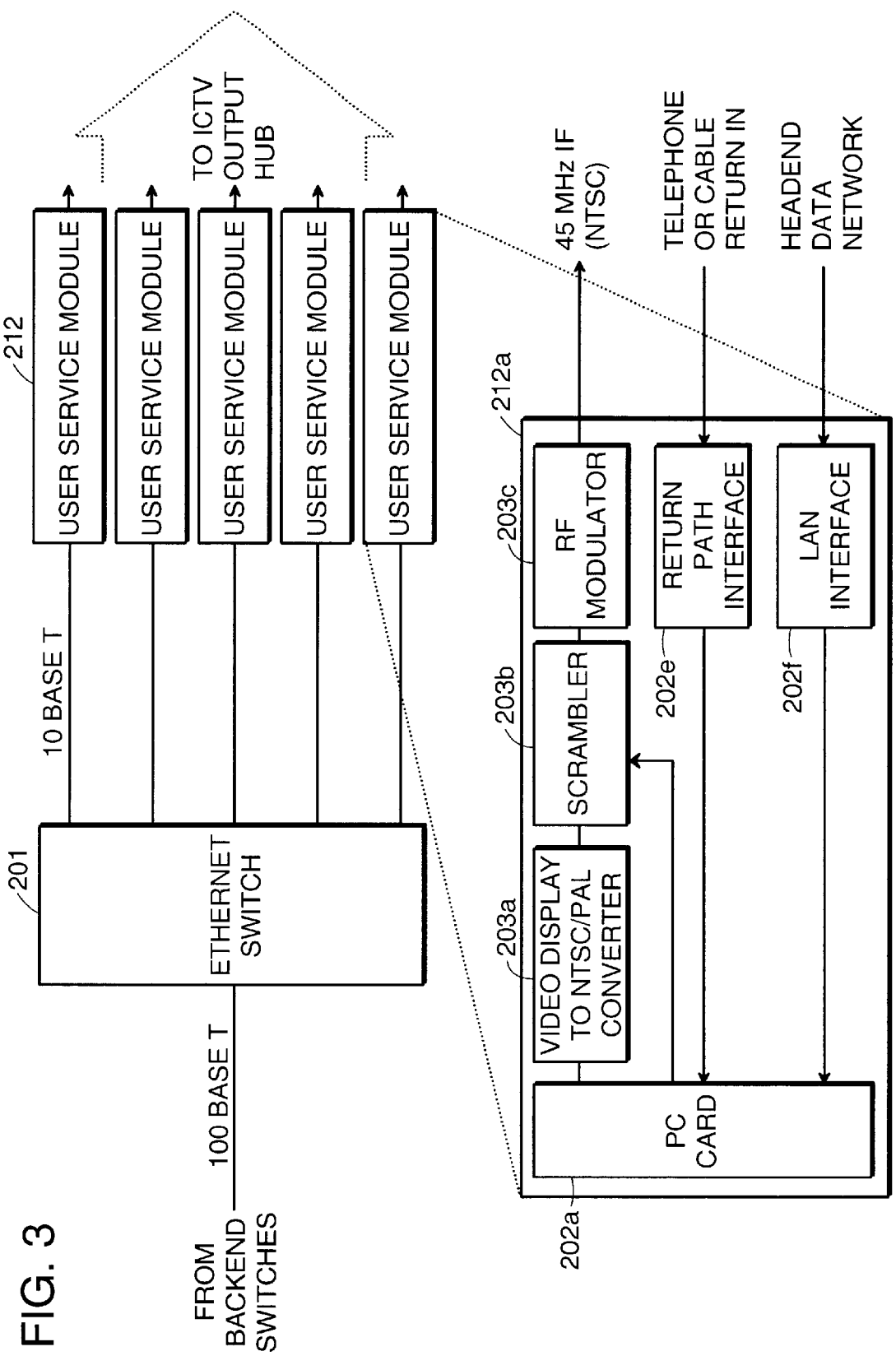
FIG. 3 is a block diagram of a front end for use in the headend of FIG. 1 with an exploded view of an analog user service module.
Figure 4:
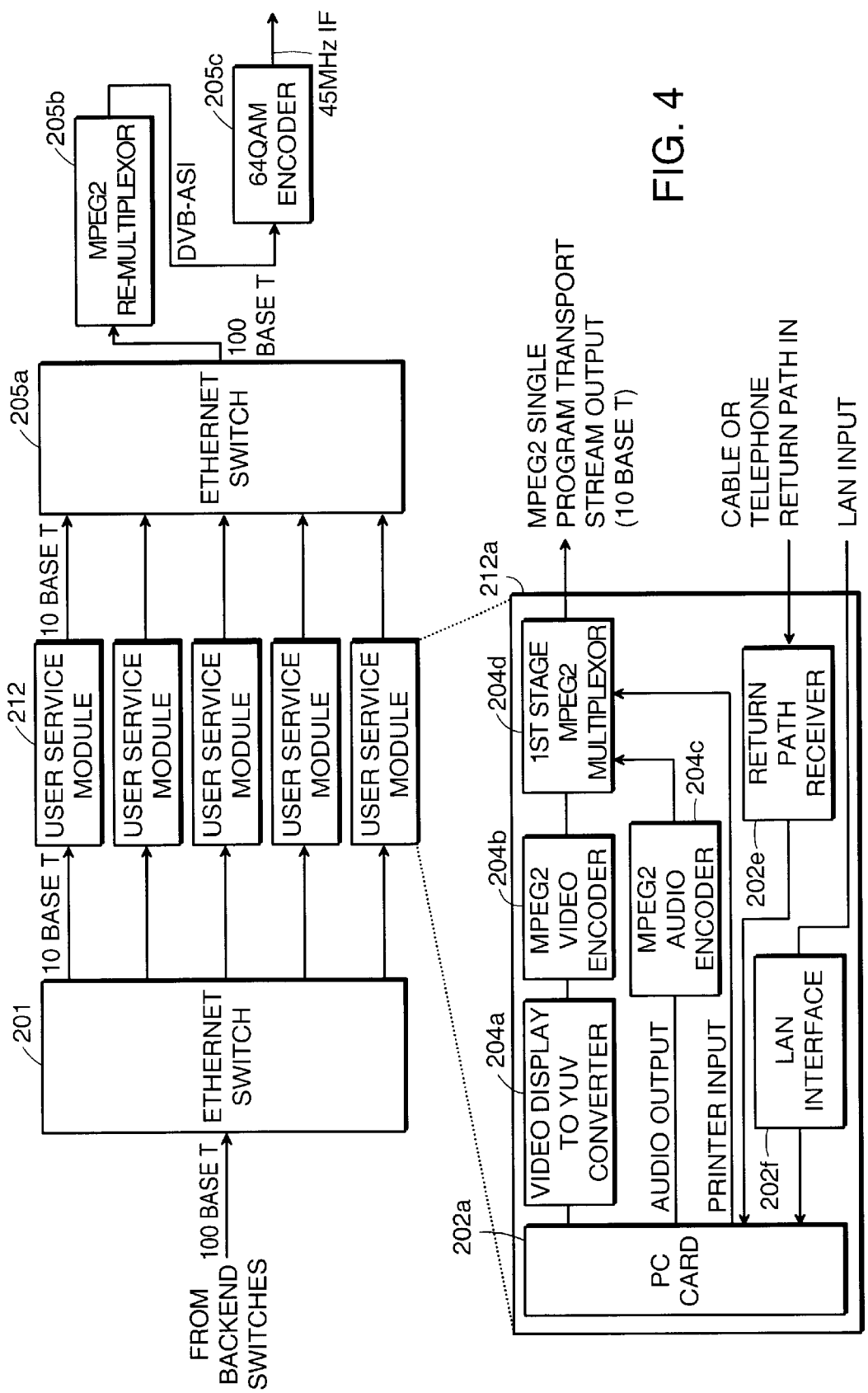
FIG. 4 is a block diagram of a front end for use in the headend of FIG. 1 with an exploded view of a digital user service module.

An embodiment of front end 12 is shown in FIGS. 3 and 4. The user service cards are preferably each housed in a single user service module 212. Ethernet switches 201 are connected to the user service modules 212. The composition of the user service modules depend on whether they are to be used for analog or digital video signal processing. Arrangement of a preferred analog user service control module 212a is illustrated in FIG. 3. A return path interface 202e receives data signals from an assigned subscriber. A LAN interface 202f enables data communications between the user service card and the headend network accessed through the distribution data switches 201. This gives the user service card 202a access to various information sources and to the system management CPUs 113. The interactive controller is found preferably in a PC card 202a which is a personal computer on a single board. The NTSC/PAL TV modulator 203 includes a video display to NTSC/PAL converter 203a, a scrambler 203b and an RF modulator 203c. The scrambler 203b can be a complete conventional scrambler providing in addition to a scrambled television signal output, a signal authorization for data transmission to the assigned subscriber to allow descrambling at the subscriber's set top. Alternatively and preferably, the scrambler 203b is a simplified scrambling unit that performs sync suppression to scramble the signal and is provided with a conditional access code (tag) for insertion into the scrambled signal. In such a system, a separate scrambler including an encrypter, an encoder and an access controller is provided in the front end 11 for each channel frequency. The access controller sends the signal authorization to each subscriber assigned to the channel frequency in any of the service areas. The signal authorization will typically include a key for decrypting the conditional access code. The encrypter encrypts the conditional access code. The encoder places the conditional access code into a scrambled reference video signal. An extractor in the separate scrambler for the given channel frequency removes the conditional access code from the reference and communicates it to each interactive control module active at the given channel frequency. The interactive control module provides a path for the conditional access code into the video scrambler 203b where it is inserted into the scrambled signal. The conditional access code may be inserted into the vertical blanking interval (VBI) or the audio subcarrier depending upon the desired system design. This scrambling system is described in copending U.S. provisional application No. 60/067,990 in a portion entitled "Distributed Scrambling Method and System". The full disclosure of the copending provisional patent application has been incorporated by reference herein. The RF modulator 203c may include an IF signal that is modulated by the scrambled television signal to produce for example a 45 MHz IF carrier for the scrambled television signal. It has also been found convenient to include the initial RF processing 301 in the analog user service control module 212a. This involves including an RF upconverter for receiving the modulated IF carrier and raising the carrier to a frequency determined by the assigned channel frequency.

FIG. 4 illustrates a digital user service control module 212b. It can be seen that the digital user service control module 212b is similar to the analog user service control module 212a as for the data input interfaces and the use of a PC card to act as the interactive controller. In the digital control module 212b, the information signal from the PC card 202a is provided to a video display to YUV converter 204a. The digital YUV output is encoded. The presently preferred encoder is an MPGE2 video encoder 204b and an associated MPGE2 audio encoder 204c. The encoded digital television signal is input to a first stage of an MPGE2 multiplexer 204d. To the extent the cable system is also used to handle print requests from subscribers, printer output can be sent from the PC card 202a to the first stage of the MPGE2 multiplexer. The printer output would ultimately be directed through the cable system to a set top and a printer connected to the settop. All outputs from the first stage MPGE2 multiplexers 204d are passed to the multiplexer and 64 QAM encoder 205. This includes Ethernet Switch 205a, MPGE2 Re-Multiplexer 205b and 64 QAM encoder 205c. The 64 QAM encoder 205c produces a 45 MHz IF signal which can then be upconverted in initial RF processing 301.

In accordance with an embodiment of the present invention, a frame server 206 is advantageously included in the headend. The frame server 206 is one or more computers for running numerous processes, each interacting with one or more assigned subscribers. Typically, it is expected that the frame server would be used for providing primarily interactive pages. The frame server will typically provide initial service to a requesting subscriber, for example, for logging on and establishing initial service. The frame server can also be effectively used to deliver E-mail messages, informational messages such as sports scores, transit schedules, weather, stock prices and other still frame oriented content. Other services can include Internet web browsing, catalog shopping, and electronic program guides. The inclusion of a frame server significantly reduces user demand for user service cards and thus holds down the overall cost of headend equipment. Rather than requiring a user service card for every subscriber that activates the interactive mode, the frame server allows many subscribers to receive interactive service without connection to a user service card. Indeed, the frame server is intended to provide an application source that is always available to respond to user interactions. Thus the system does not block but can always respond to an arbitrarily larger number of users albeit one frame at a time.

A subscriber interacts with a particular application within the frame server environment. The resulting outputs from the application are captured one display frame at a time and converted to the MPGE2 or other suitable format. After conversion, the frame is transmitted to the user for decoding and display on the user's television set. The frame server uses one digital channel on a cable television or other broadband system. All subscribers accessing the frame server connect to the common channel. A frame of video representing the output of the software application with which the subscriber is interacting is uniquely addressed to that subscriber and transmitted over the common channel, much as all packet switched networks operate. Only the digital settop terminal to which the frame of video is addressed will decode the frame. It is expected that a subscriber interacting with a frame server application will receive requested interactive pages in less than two seconds from the subscriber's request.

Referring now to FIG. 5, the frame server 206 will be described in greater detail. The frame server system will typically operate as a collection of individual software processes that run on a single computer for small system use. The frame server can be scaled to run on a networked cluster of computers acting in concert. The frame server 206 includes a plurality of information servers. These may include a web server 206b, a mail server 206c, a news server 206d and a message server 206e. Each information server provides its own particular class of information. Locally generated messages are created by the message page generator 206f which provides those pages to the message server 206e. A cluster of message servers assist in the generation of pages of information and cover various message types including in the presently preferred embodiment a customer service message server 206g, a help and error message server 206g' and a third-party message server 206g". The third-party message server encompasses such content as local advertiser messages.

Regardless of server source, the message pages (video frames) are presented by the various respective servers to the user web browser 206h. All messages are created using HTML protocol so that regardless of source, the information is rendered via a web browser process 206h. The subscriber interacts with a web browser process via a return path processor 206q and request scheduler 206r. The return path processor receives user keyboard and pointer (mouse) commands from subscribers via the return path switch 103. The received user commands are processed by the return path processor 206q and passed to the request scheduler 206r for routing to the web browser process 206h handling a given user. The web browser establishes a state machine that tracks the user's inputs and generates requests to the appropriate server source.

Each active web browser process 206h renders an image in RAM from HTML source received from a particular server. The rendered output is then passed to an RGB to YUV display driver 206j which converts the program generated display information from the standard RGB format to YUV which is the input format used by MPGE2 compression systems. This YUV rendered display frame is stored in a user virtual display memory 206k. A multiplexer, referred to herein as a user encoder queue manager 206m, sequences the multiple user display pages through a FIFO to queue up for the MPGE2 I-frame encoder 206n for MPEG compression. The compressed signals are eventually transmitted to the respective subscriber via MPEG frame addressing 206p which provides addressing and system information appropriate to the digital settop in use by the system. The resulting data stream, including various user display frames, is routed into the switching output RF hub for distribution to the requesting subscribers.

Figure 6:
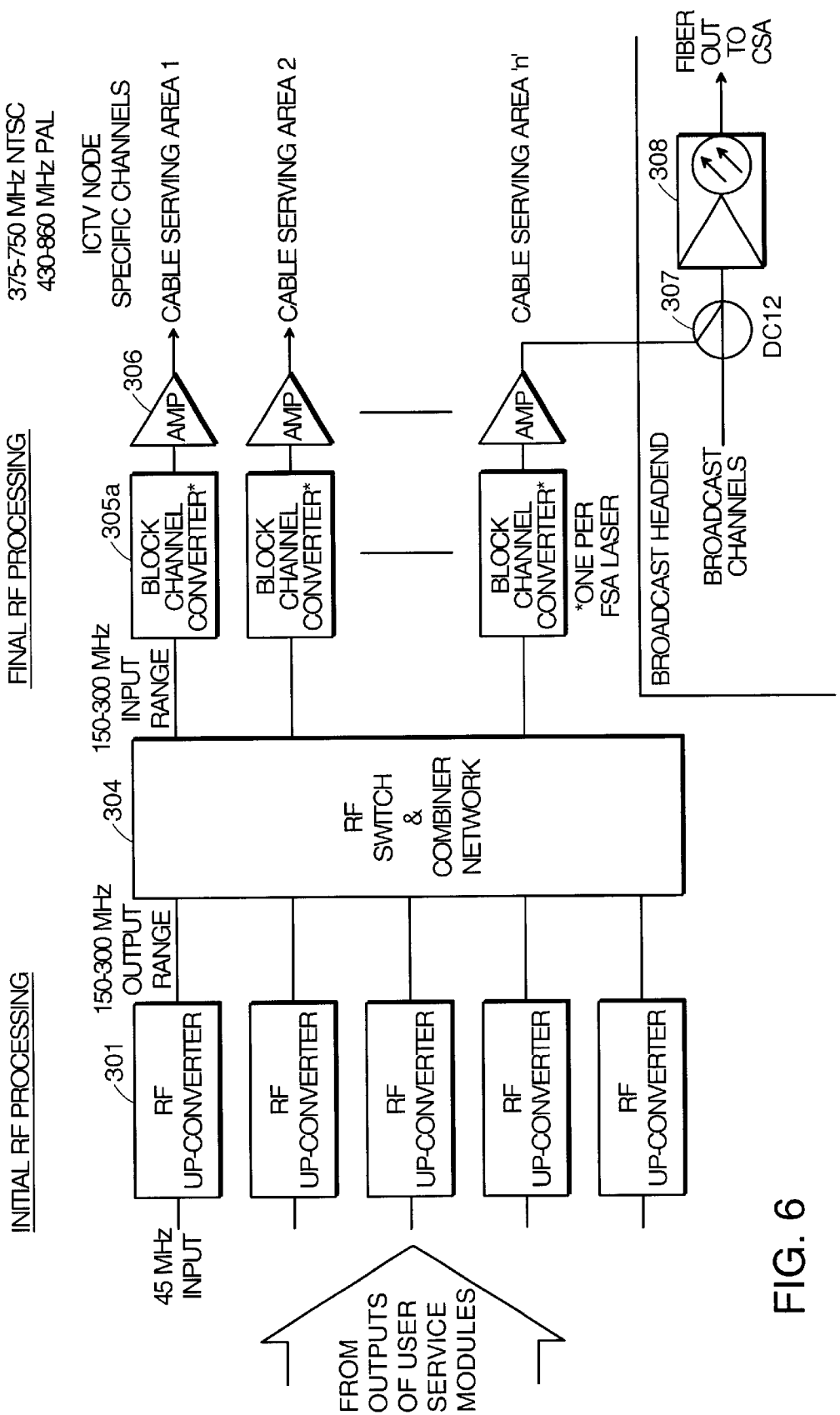
FIG. 6 is a block diagram of a switching output RF hub for use with the headend of FIG. 1.

An embodiment of switching output RF hub 13 is shown in FIG. 6. Initial RF processing is performed by RF up-converters 301, converting 45 MHZ input to an output in the range of 150 to 300 MHZ. The upconverters are preferably capable of modulating a carrier that is tunable under control of the system management CPUs 113, so that any given upconverter may be configured to best handle demands placed on the system. RF switch and combiner network 304 provides the upconverted signals to final RF processing 305, which in FIG. 6 are indicated by block channel converters 305a and amplifiers 306. There is one block channel converter 305a for each service area. The interactive signals for delivery to a service area are combined with broadcast channels that are identically transmitted to all service areas. FIG. 6 illustrates this for one of the service areas where combiner 307 is shown. An optical transmitter 308 is used for sending the combined signals out over optical fiber.

Figure 7:
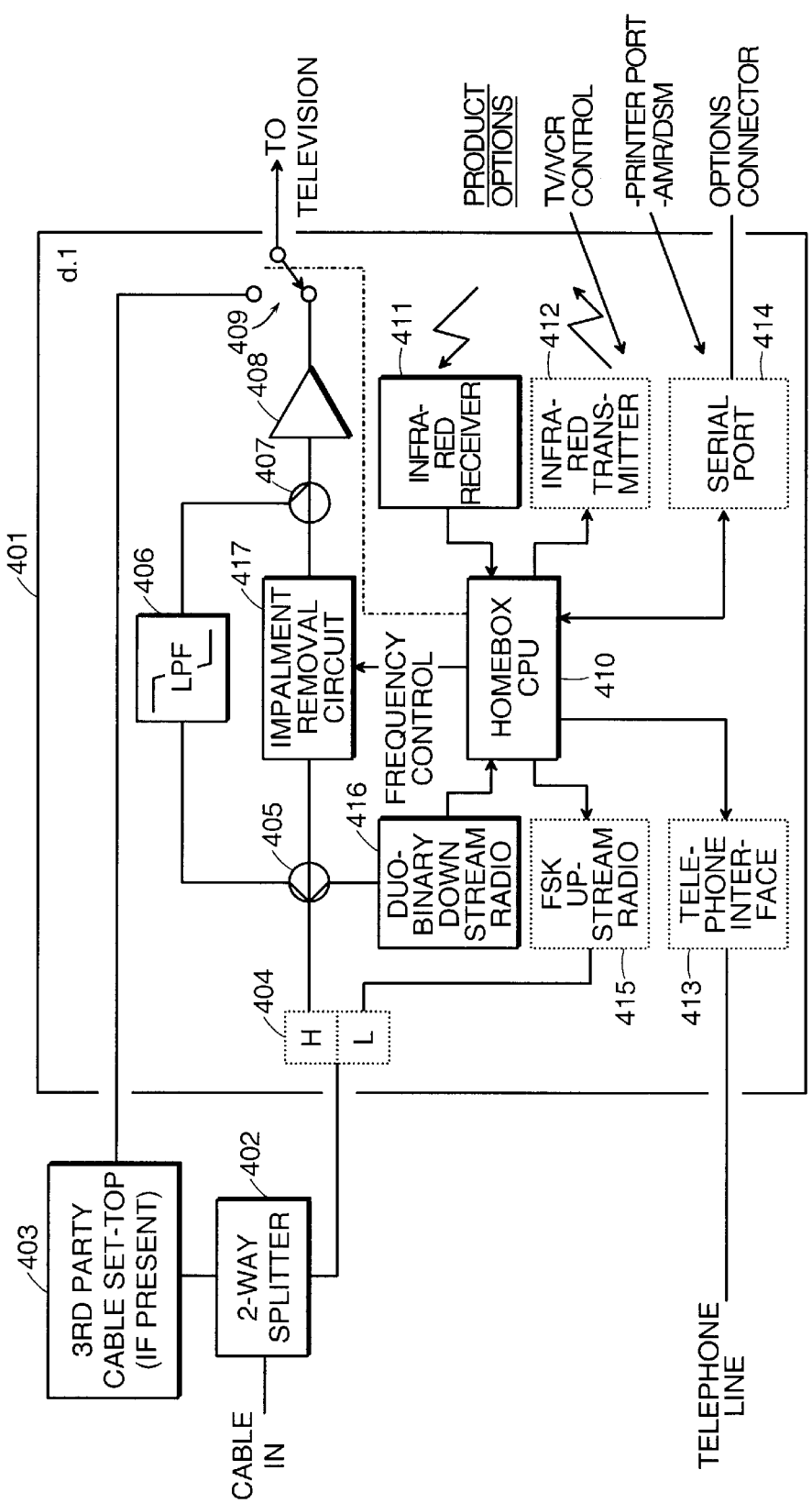
FIG. 7 is a block diagram of a home interface controller for use in connection with the headend of FIG. 1.

Each subscriber of the system is equipped with a home interface controller 401 through which all interaction is conducted with the headend. Preferably, the home interface controller both receives the television signals from the cable and conducts data communication. However, the data communications could be handled by a separate box connected to a phone line, if desired. A presently preferred home interface controller 401 is shown in FIG. 7. A cable carrying the television signals from the subscriber's service area is connected to a two-way splitter 402 which may also be connected to a cable set-top 403 provided by a third party. A diplex filter and combiner 404 provide a first frequency path to splitter 405 and a second frequency path to FSK (frequency shift-key) radio 415, where the first frequency path occupies a higher spectral region than the second frequency path. The first frequency path provides a downstream path for signals going from front end 12 to the user of the home interface controller whereas the second frequency path provides an upstream path for signals going from the user to front end 12. An alternate upstream path may be provided through telephone lines via a telephone interface 413.

Splitter 405 provides a signal path to low pass filter 406 and an impairment removal circuit 417. The outputs of the low pass filter 406 and the impairment removal circuit 417 are re-combined at combiner 407, then amplified by amplifier 408. Switch 409 allows the user of the home interface controller 401 to switch between the signal output of amplifier 408 and the output of the third party set-top 403 (if present). Switch 409 may also be under control of home box CPU 410.

Home box CPU 410 provides control and communication signals to impairment removal circuit 417, FSK upstream radio 415, telephone interface 413, serial port 414 and infrared transmitter 412. FSK upstream radio 415 is a modulator for providing a data communication link through a low frequency band on the cable between the home interface controller 401 and front end 12. Collectively, the upstream radio 415 and downstream radio 416 constitute the transmitter and receiver, respectively, of a data transceiver. In addition to or instead of the FSK upstream radio 415, telephone interface 413 can be used to provide communication over ordinary telephone lines to the front end 12. Infrared transmitter 412 may be used to communicate with the cable set-top 403 or the television. For example, when interactive mode is requested, the infrared transmitter can transmit the assigned frequency to the set-top or television tuning the appropriate appliance to receive the interactive television display. The frequency is learned by the CPU 410 through the downstream radio in communications from the headend. Infrared receiver 411 receives commands from a subscriber selection device. The subscriber selection device may be a typical television remote control or may include a keyboard, a mouse or other input device. The subscriber will have a channel selection input available for selecting a program on at least one of the available selection devices.

A serial port 414 may be advantageously included on the home interface controller to provide communication with a printer for hard copy printouts. The serial port enables the subscriber to connect a printer to the home interface controller. When a subscriber is using the interactive system to browse the Internet, read E-mail, review advertisements or other still frame viewing, a print command can be used to obtain a printout of information. When the print command is received by an assigned interactive controller at the headend such as in digital control module 212b, the output to the subscriber can be changed to a printer output which the home interface controller receives and passes along through the serial port to the attached printer.

It is contemplated that households having printers, generally have them attached to their home computer. Such persons may be unwilling to purchase an additional printer for their interactive television system or to move their printer from the computer to the television. The interactive system described herein may be used to create a virtual local area network. An additional home interface controller may be installed in the home for connection to the printer. The television cable into the home may be connected to this home interface controller in addition to connection with the home interface controller of the television. A subscriber operating in interactive mode and viewing a television screen may activate a print command by clicking a mouse with a cursor on the screen over a print icon, by simply keying in a print command or other input method. The application at the headend communicating with the subscriber will ask the subscriber to which home interface controller should the print output be sent. The destination for print output can be pre-entered as a default, set up early in an interactive session or entered when printing is desired. When the print command and destination are received at the headend, the printer output from the application can be addressed to the destination home interface controller instead of the requesting home interface controller. When printing is complete, the application can return to interacting with its assigned requesting home interface controller. In accordance with this method of operation, the destination home interface controller can be anywhere on the cable distribution network. Thus a user can cause a print out at an office printer, a relative's printer or indeed any printer the user can identify. For the user at home, printing through a printer at home it may seem that the print command is causing a transfer of the screen being viewed on television directly to the printer in another room. In reality, the print command will travel up to the headend causing the headend to deliver the print output down through the cable to the designated home interface controller with an attached printer. The home interface controller will need to always be listening to a data communication link or to the frame server common channel so as to recognize and receive information addressed to itself.

Figure 8A:
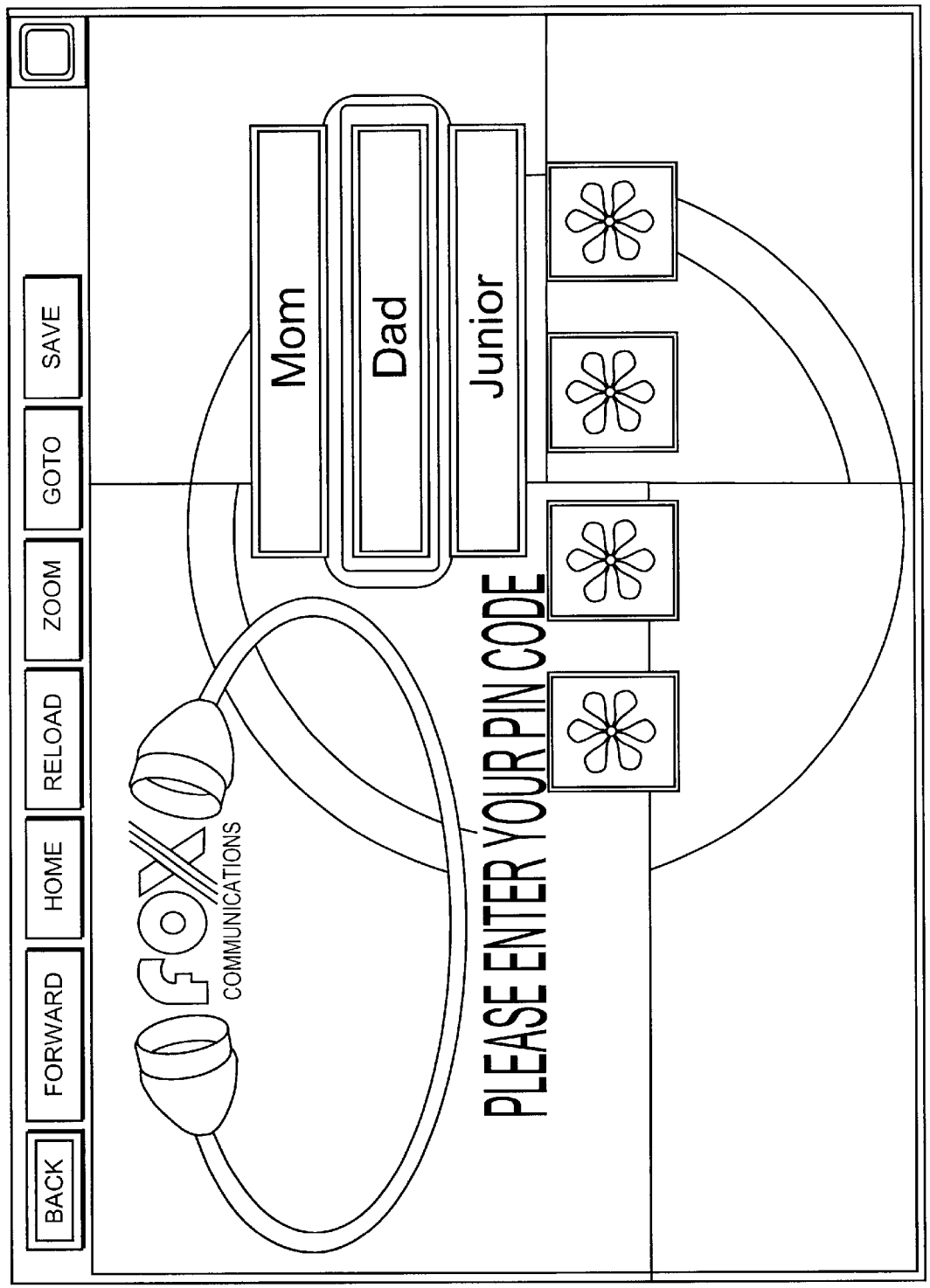
FIGS. 8A–8F illustrate examples of subscriber television screen displays during an interactive session.
Figure 8B:
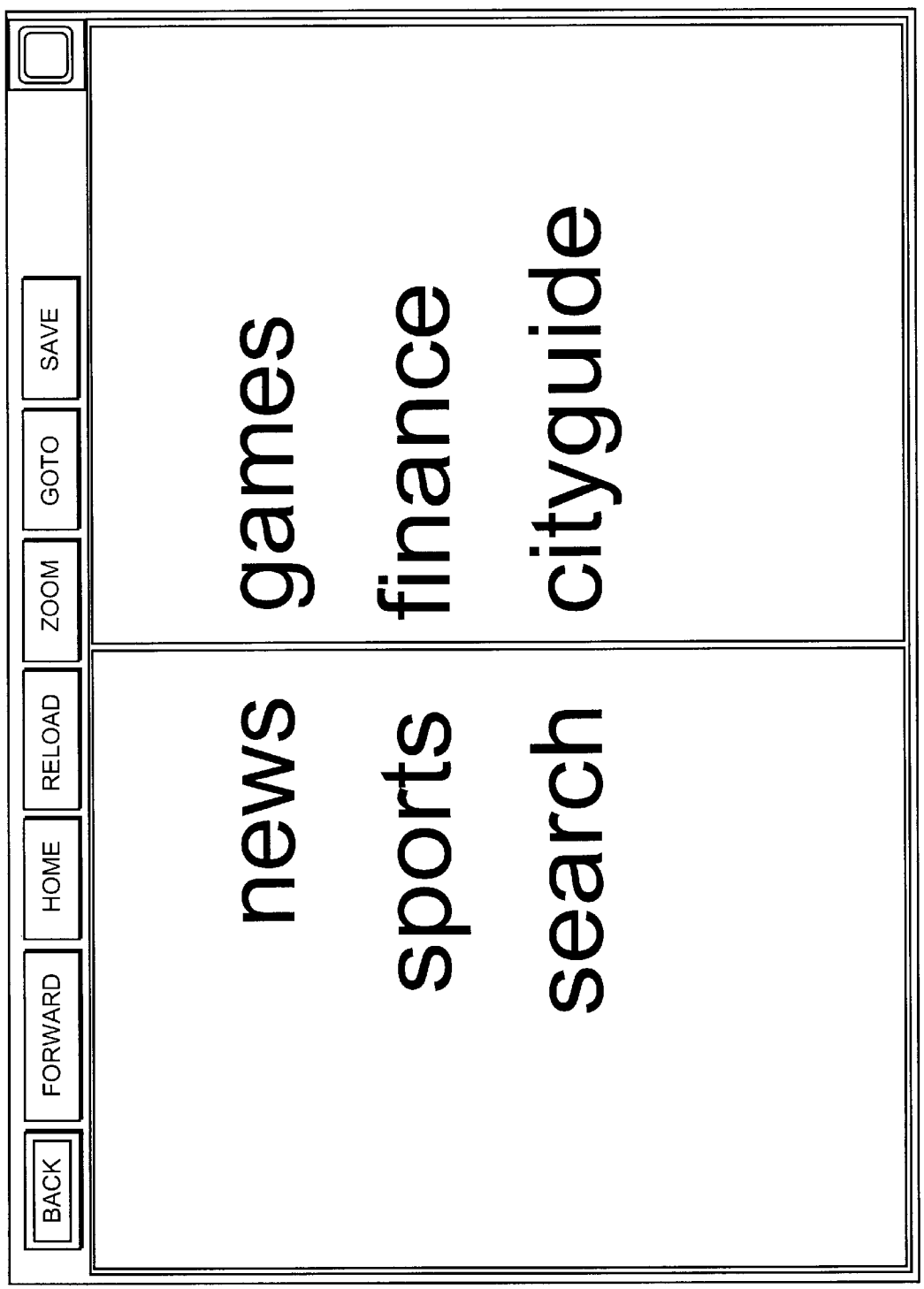
Figure 8C:
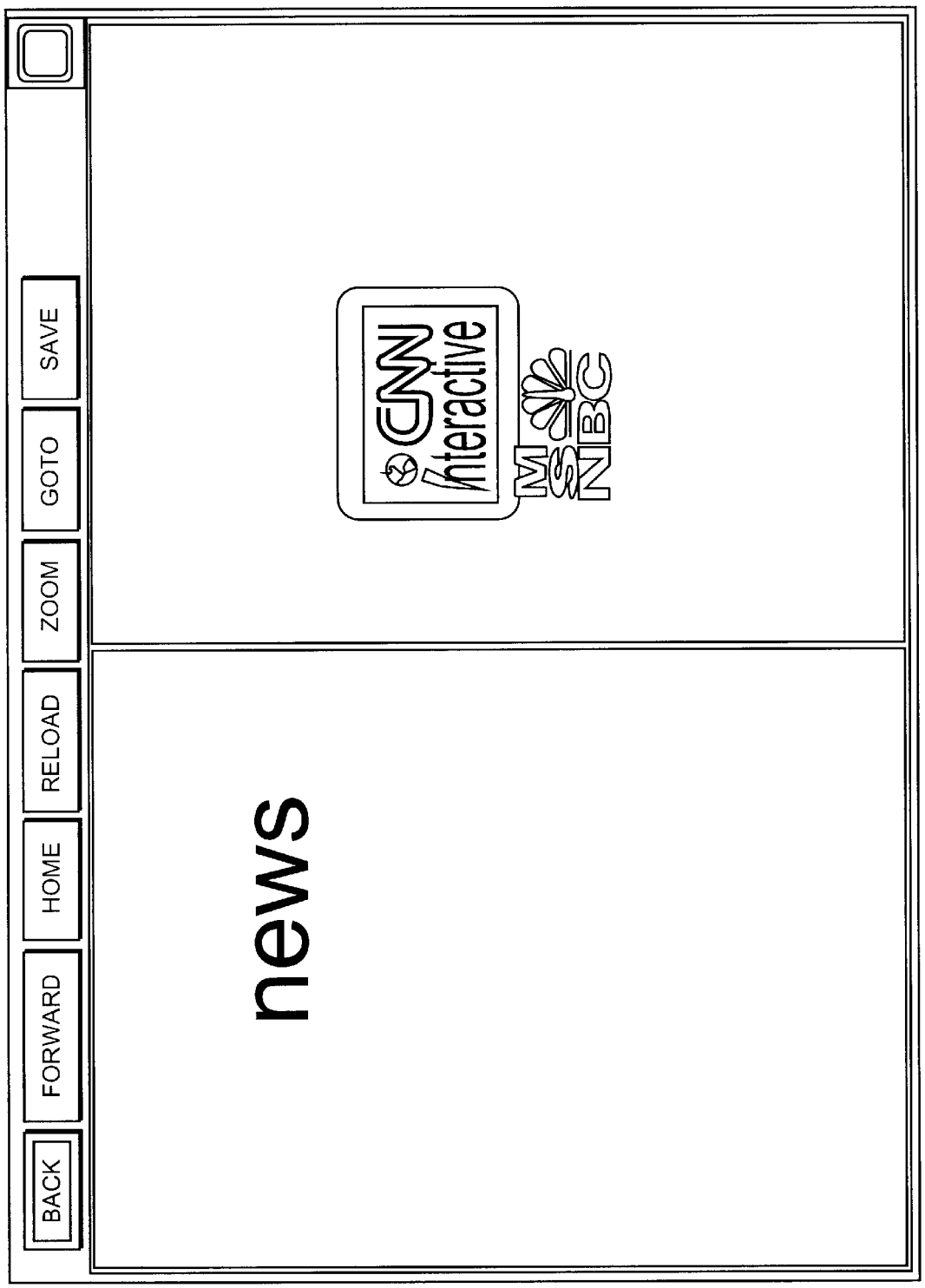
Figure 8D:
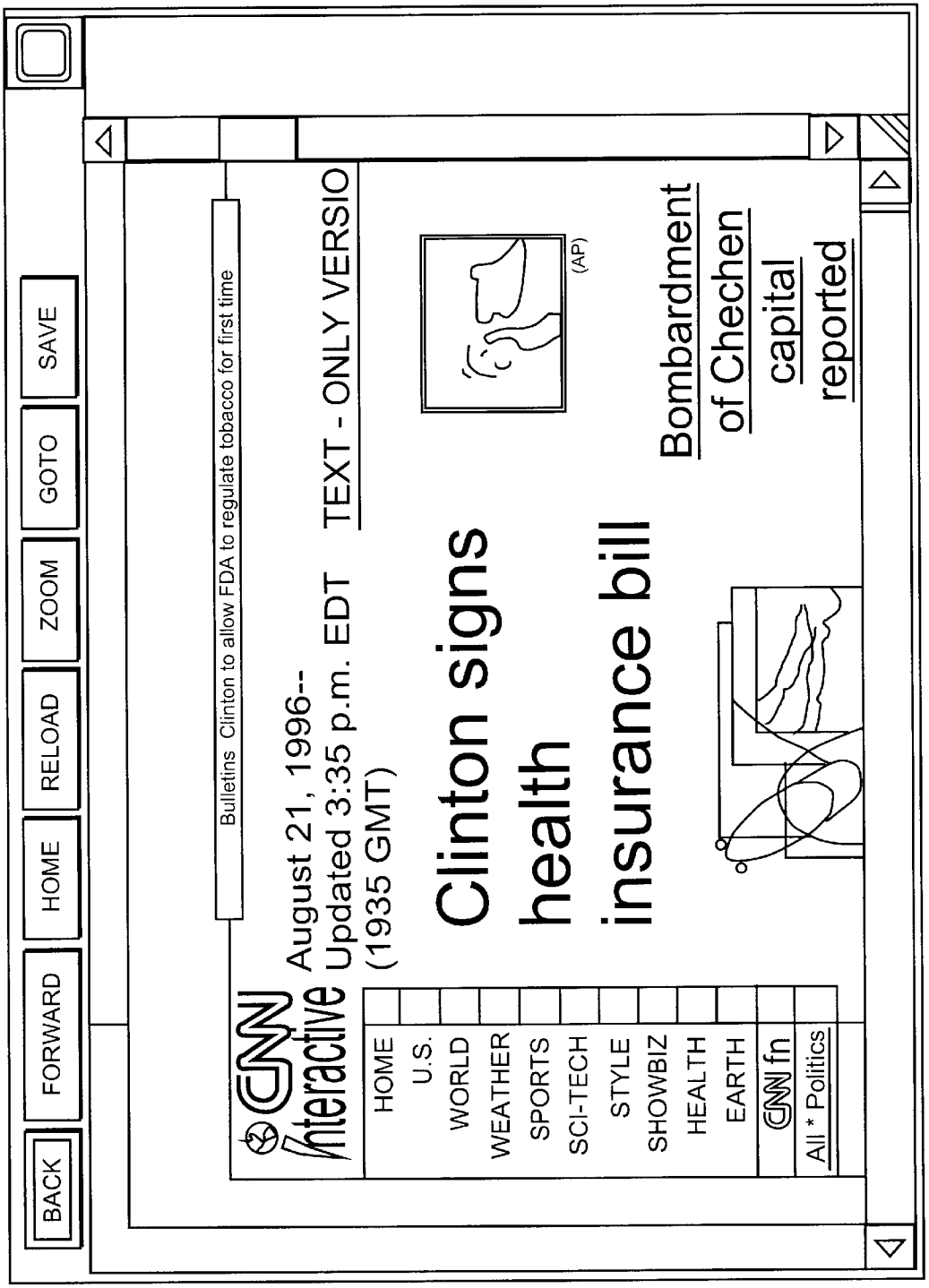
Figure 8E:
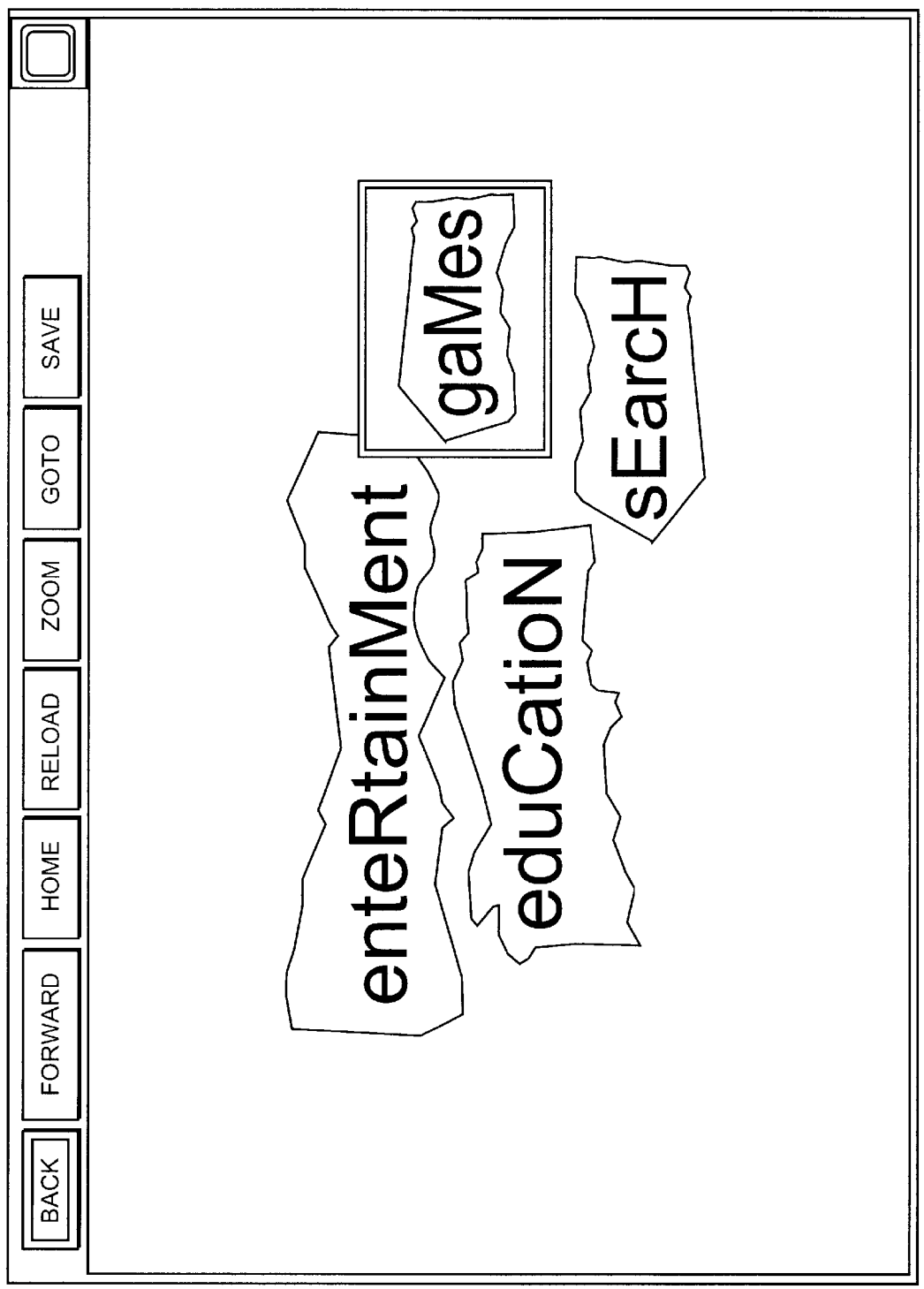
Figure 8F:
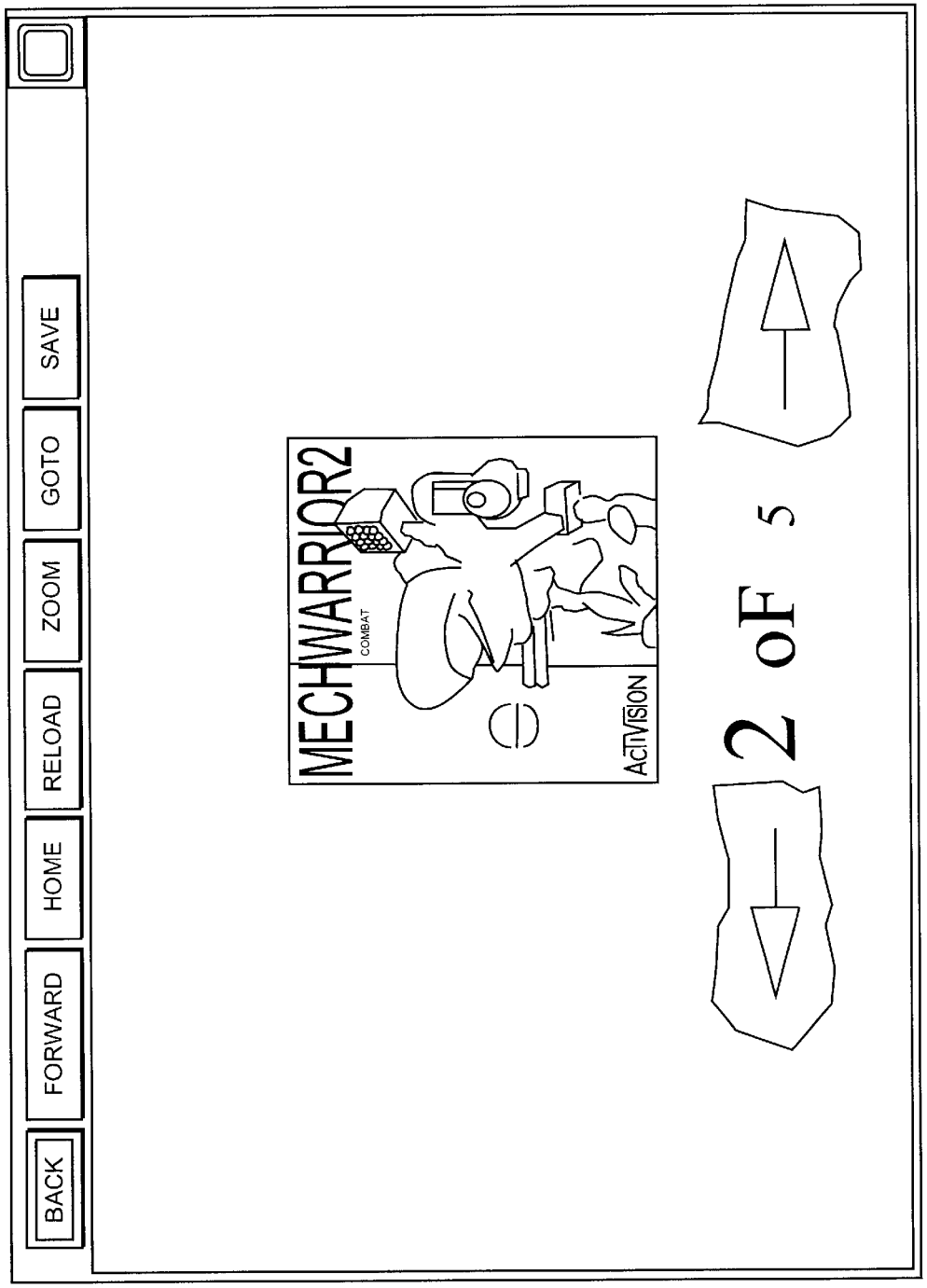

When a user of the home interface controller requests an interactive service from head end 12, such as Internet service or a video game, an appropriate frame server application or user service module is placed in use for providing the service to the user. The user selects the desired service by using the subscriber selection device in conjunction with the home interface controller. Examples of screen displays available to the user for selection of a service are illustrated in FIGS. 8A–8F. FIG. 8A shows a beginning display, in which front end 12 requests appropriate information from the user, including a PIN code number. In this way, for example, children may be blocked from requesting unsuitable video content. Once the back end 11 identifies the user (this will be discussed in more detail later), various options are available, as shown in FIG. 8B. FIG. 8C shows a screen in which the "news" option of FIG. 8B has been chosen. In FIG. 8C, once the user has decided to choose a news program, the user may decide to choose CNN or MSNBC. FIG. 8D shows the screen when the user has selected the CNN option of FIG. 8C. FIG. 8E is similar to FIG. 8B, except that this screen appears when the "Junior" button and appropriate PIN code is entered in FIG. 8A. FIG. 8E shows the screen that results when the "games" button in FIG. 8E is entered. It should be noted that the interaction here is via an Internet-type browser, which permits not merely surfing the Internet, but actually selecting different information services using hyperlinks.

Figure 9:
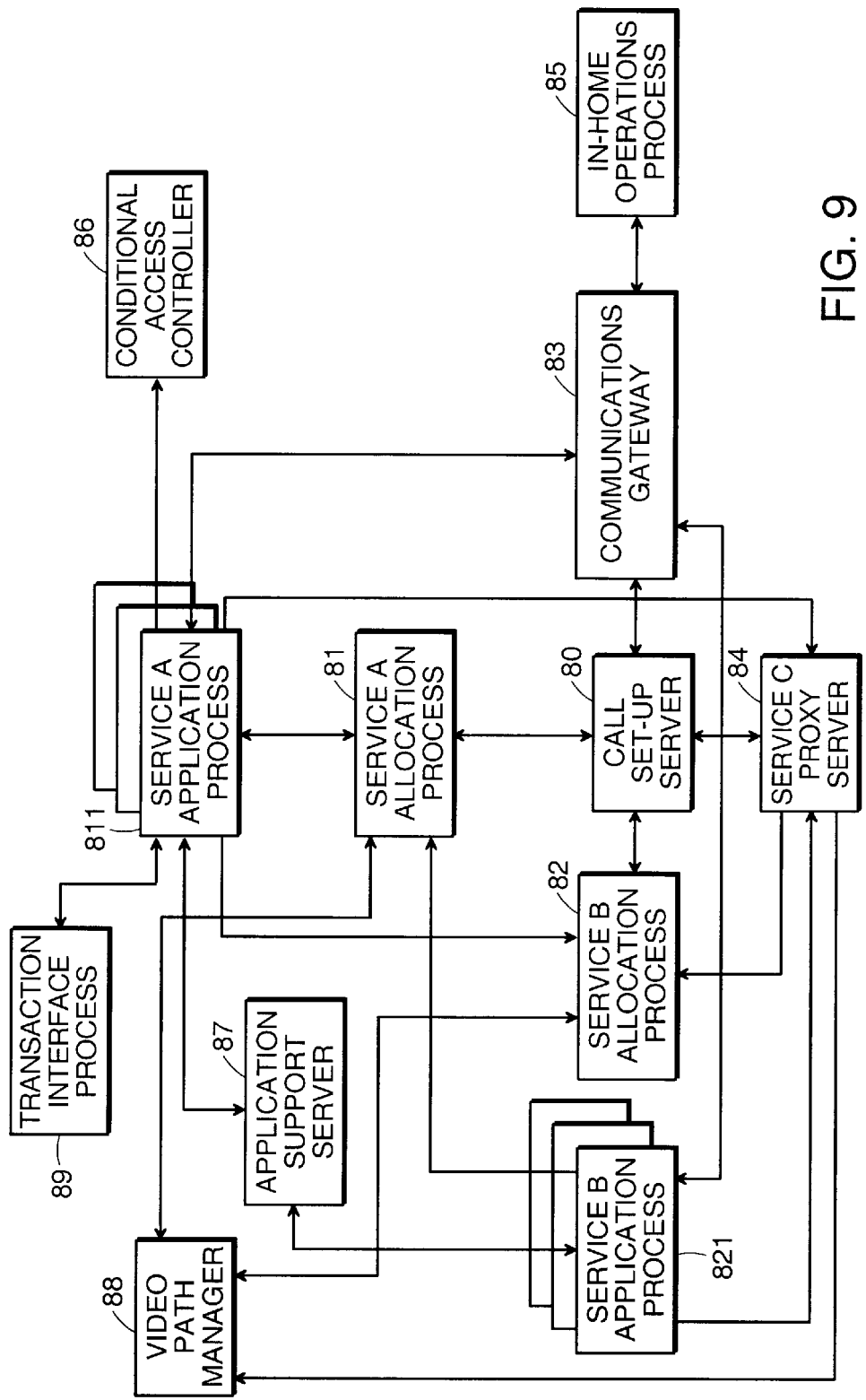
FIG. 9 illustrates a system diagram of a system manager for use in the headend of FIG. 1.

FIG. 9 illustrates a system diagram for system manager 108, indicating the two functions of (1) call set-up and tear down and (2) resource allocation with the interactive TV system of FIG. 1. Call set-up is the process of causing the assignment of a television information signal path to the home interface controller for interactive service, and resource allocation is the process of assigning appropriate user service cards and virtual circuits within the switching system in the back end.

Call set-up is initiated by a small program in the home interface controller which keeps track of the channel the user is watching. The channels are broken into bands where, for instance, channels 2 through 73 are assigned regular TV programming both off-air TV channels as well as cable channels such as MTV, HBO, CNN, etc. The band above this broadcast band uses channels 74 to 79, for instance, for interactive services where a user is assigned one of these channels only during the duration of that user's interaction with the interactive TV system (i.e.—while looking up a restaurant in the entertainment guide, or while watching a movie, etc.). A user may tune from a broadcast channel (e.g.—ch. 37 CNN) to an interactive service virtual channel, at which time the user will be provided with the screen displays of the type shown, for example, in FIGS. 8A through 8F. When the user selects interactive service, the small program in the home interface controller sends a signal to the system manager at the back end to initiate call set-up.

The system manager in back end 11 begins the call set-up process through a system manager subsystem called the call setup server (CSS) 80. The CSS 80 finds a free interactive element or selection element corresponding to the virtual channel number the user is trying to tune to. As an example, assume the user is interested in movie previews which are viewed through interacting with a user service card and a program run on service "A" application process 811. The CSS 80 will call a video path manager subroutine to check for an available television information channel within the band of television information signals allocated to provide interactive service to the neighborhood of the requesting user. The newly assigned television information signal of the requesting user and the user's network address is passed to a service allocation server (SAS) 81 associated with the application process.

Assuming a non-blocked call, the system management function has now passed from the CSS 80 sub-system to the SAS 81 (for this example). The CSS 80 is now out of the loop. The SAS 81 checks for a free resource, i.e., a processor for running a service application process. If one is available, control is passed to it along with the assigned television information signal and address of the calling user. The processor, in this example, is a user service PC card 202a. The service application process run by the PC card 202a sends a request to the application support server 87 for subscriber information to authenticate the user id for the neighborhood from which the signal is originating. The service application process also requests subscriber information from the application support server 87 customer database to check for paid-up service and/or access to service permission (e.g.—used to block children from viewing R rated movie previews, for one example). Upon success, the service application process directs the conditional access controller (CAC) 86 to send a descramble key code to the user's set-top converter to allow it to descramble the video signal that the service application process will be using. The service application process also communicates directly with the in-home operations process (IHOP) 85 running in the home interface controller CPU 410, informing the program of the assigned television information signal. A separate processor in the set-top receives the descrambling authorization keys and translates them.

The set-top IHOP 85, upon receiving the assigned channel, tunes the cable TV set-top to the assigned channel. The user will see the output of the SAP 811 and can begin using the remote control to manipulate the program running on the SAP 811. The in-home operation process 85 transmits appropriate remote control commands addressed to the processor/process assigned to it. When the user tunes to a broadcast TV channel, the call take down process is initiated by the set-top system manager extension signaling the 811 that the user has tuned away, and, after a time-out period (for instance, five minutes), the 811 signals the call set-up server 80 to release the interactive virtual channel previously assigned. The virtual channel is logged back into the free channels list by the CSS 80. At the same time, the SAP 811 signals the SAS 81 that it is now a free resource and the SAS places the user service card that had provided the application process on its free card list.

The example above is the same for other kinds of user service cards for interactive multimedia, such as video game player cards, and MPEG-to-video decoder cards 208. A user service card can be used for a front end application such as movie previewing and purchasing. When the user picks a movie using a user service card, the user service card will then pass control of the user to a control program that manages movie playback and decompression (MPGE2 to NTSC). When the movie is over, the movie playback control program follows the same steps of call take down as the user service card did.

The above system management scheme can accommodate any number of diverse services in a fully distributed manner such that there are no bottlenecks in the system. This affords optimal performance in response to user requests. By distributing the processing of communications with home interface controllers throughout system management, a greater amount of processing can be conducted in less time with less expensive processing units.

System management may include separate service allocation servers 81 or 82 for each of the video on demand system, the digital user service cards and the analog user service cards. Moreover, there may be additional service allocation servers further dividing the user service cards into groups according to the type of interactive service provided. Thus, there may be a service allocation server for movies only, for games, and for catalogs. The service allocation servers act as intermediaries between the call set-up server and the video provider elements whether they be analog user service cards, digital user service cards, frame server web browser applications 206h or MPEG-to-video decoder cards 208. The service allocation servers provide distributed management. The call set-up server 80 can pass the call set-up to the appropriate service allocation server. As the service allocation server identifies a video provider element and completes the connection with the home interface controller, the call set up server can be attending to the next caller.

The communications gateway 83 acts as a translator between the IHOP 85 and the back end 11 LAN connecting the distributed processes of the system manager. The communications gateway 83 translates the IHOP address from an individual user into a global Internet Protocol (IP) address for addressing Ethernet data packets within the back end LAN. IP is part of TCP/IP. Communications are directed from the communications gateway 83 to the application process directly. Once the service allocation server assigned to a home interface controller has put the home interface controller in communication with the requested application process, the communications can be handled directly. System management is also required to maintain administrative tasks such as billing. Each of the service application processes is in communication with a transaction interface process so that billing and credit and other financial matters can be taken care of.

Figure 10:
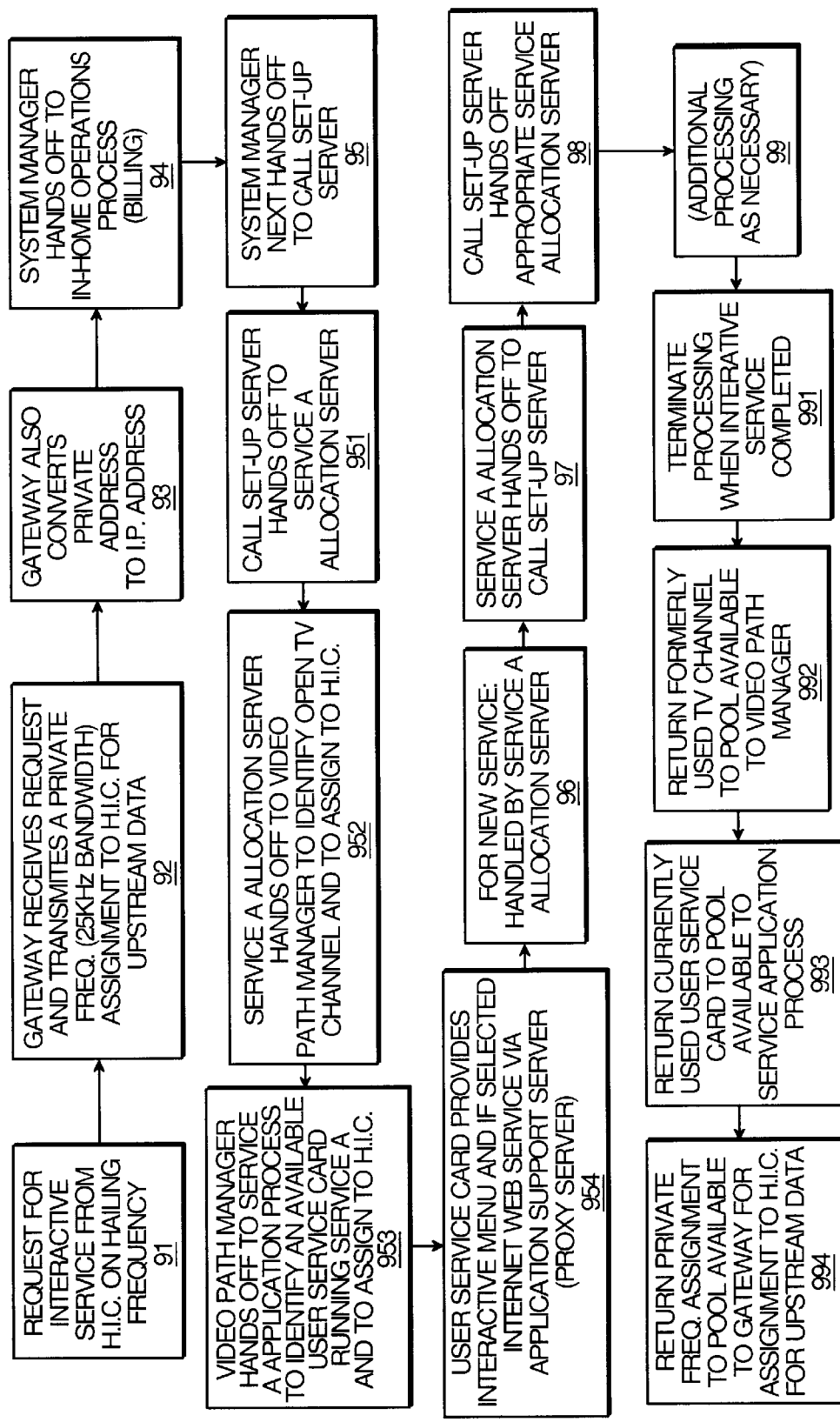
FIG. 10 is a flow diagram for a call set-up and tear down procedure for use by the system manager of FIG. 9.

FIG. 10 illustrates a flow diagram for a call set-up and tear down procedure as shown in FIG. 9. In FIG. 10, step 91 indicates that a request for an interactive service from a home interface controller is made on a hailing frequency. The hailing frequency need only occupy a relatively small bandwidth at a relatively low carrier frequency (compared to ordinary television signals). In step 92, the gateway receives the request from the user and transmits a private frequency (approximately 25 kHz bandwidth) assignment to the home interface controller to be used for upstream data. Instead of a private frequency, the gateway may transmit the frame server common channel or this channel may be a default initial channel without need for notification. In step 93, the gateway also converts the private address to an IP address, as discussed in relation to FIG. 9. In step 95, the system manager hands off to the call set-up server, and in step 951, the call set-up server hands off to the service A (for example) allocation server. In step 952, the service allocation server hands off to the video path manager to identify an open TV channel to assign to the home interface controller. In step 953, the video path manager hands off to service A application process to identify an available user service card to run service process A and to assign to the home interface controller requesting the requested service. In step 954, the assigned user service card provides an interactive menu and, if selected, Internet Web service is provided via an application support server (proxy server). Step 96 indicates that a newly requested service is handled by service A allocation server. If a new service is requested, then in step 97 the service A allocation server hands off to the call set-up server, and in step 98 the call set-up server hands off to the appropriate service allocation server. Step 99 indicates that additional processing maybe necessary, depending upon the requested service (as discussed in relation to FIG. 9). Application processing is terminated in step 991 when the interactive service is completed, whereupon in step 992 the assigned TV channel is returned to the pool of available channels to the video path manager. Also, upon completion of the interactive service, the assigned user service card is also made available to the pool of available service application processors. In step 994, the assigned frequency is returned to the pool of available frequency assignments so that the gateway can re-use the frequency for upstream data from another home interface controller.

Further details regarding system management and the use of service allocation servers therein can be found in copending U.S. Application No. 08/987,405, filed Dec. 9, 1997, entitled "System Manager and Hypertext Control Interface for Interactive Cable Television System" and having the same assignee as the present application. The full disclosure of said copending patent application is hereby incorporated by reference herein.

Figure 11:
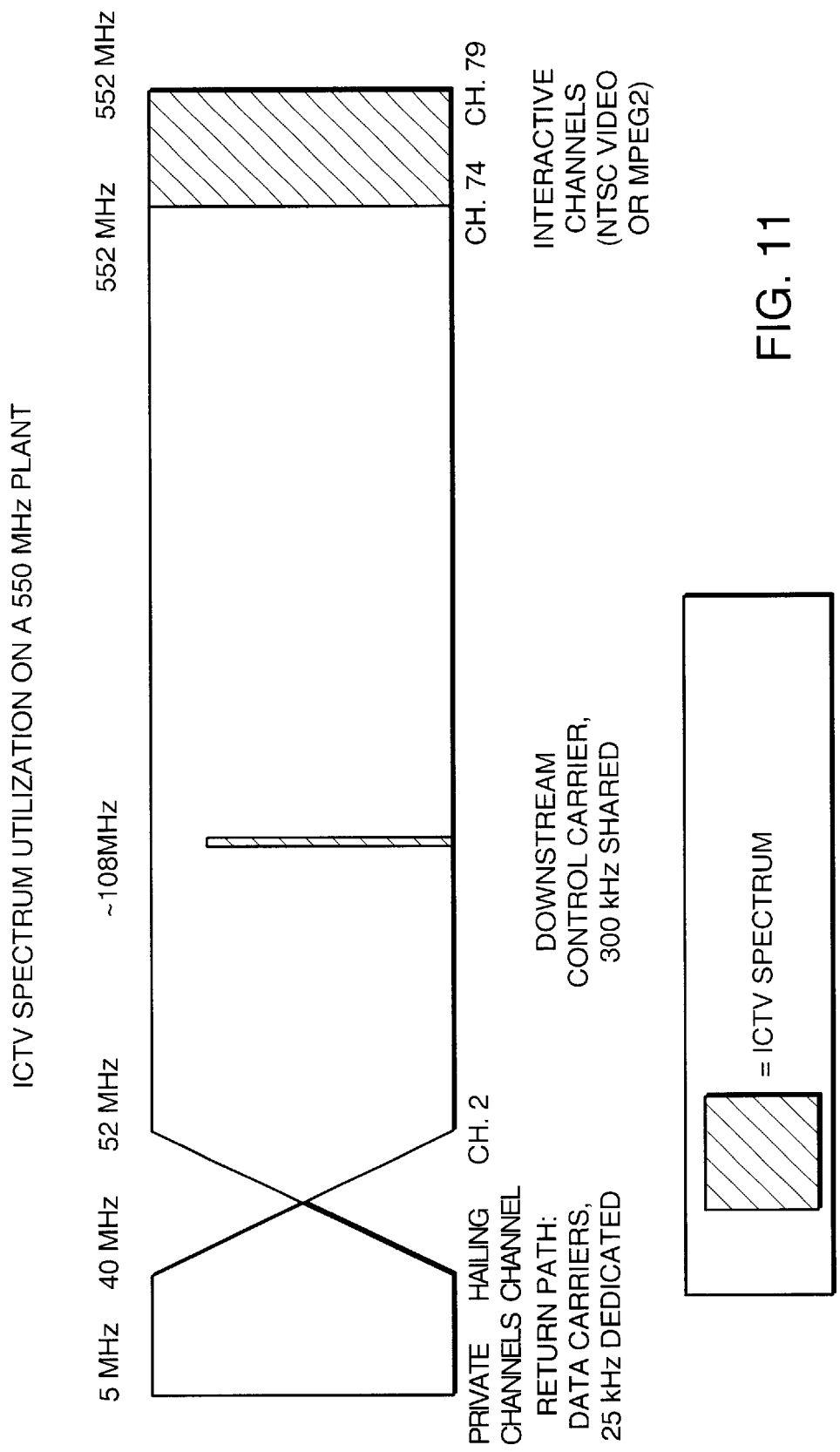
FIG. 11 illustrates the frequency spectrum of the various signals used by a cable television system incorporating the headend of FIG. 1.

FIG. 11 indicates the frequency spectrum of the various signals used by the television system. The spectrum to the left of the left-to-right arrow in FIG. 11 indicates upstream data, whereas the spectrum to the right of the right-to-left arrow in FIG. 11 indicates downstream data. Interactive channels (NTSC video or MPGE2) are in channels 74–79 (522 MHZ to 552 MHZ). Upstream data has a small bandwidth of 25 kHz in the frequency range of 5 MHZ to 40 MHZ.

Figure 12:
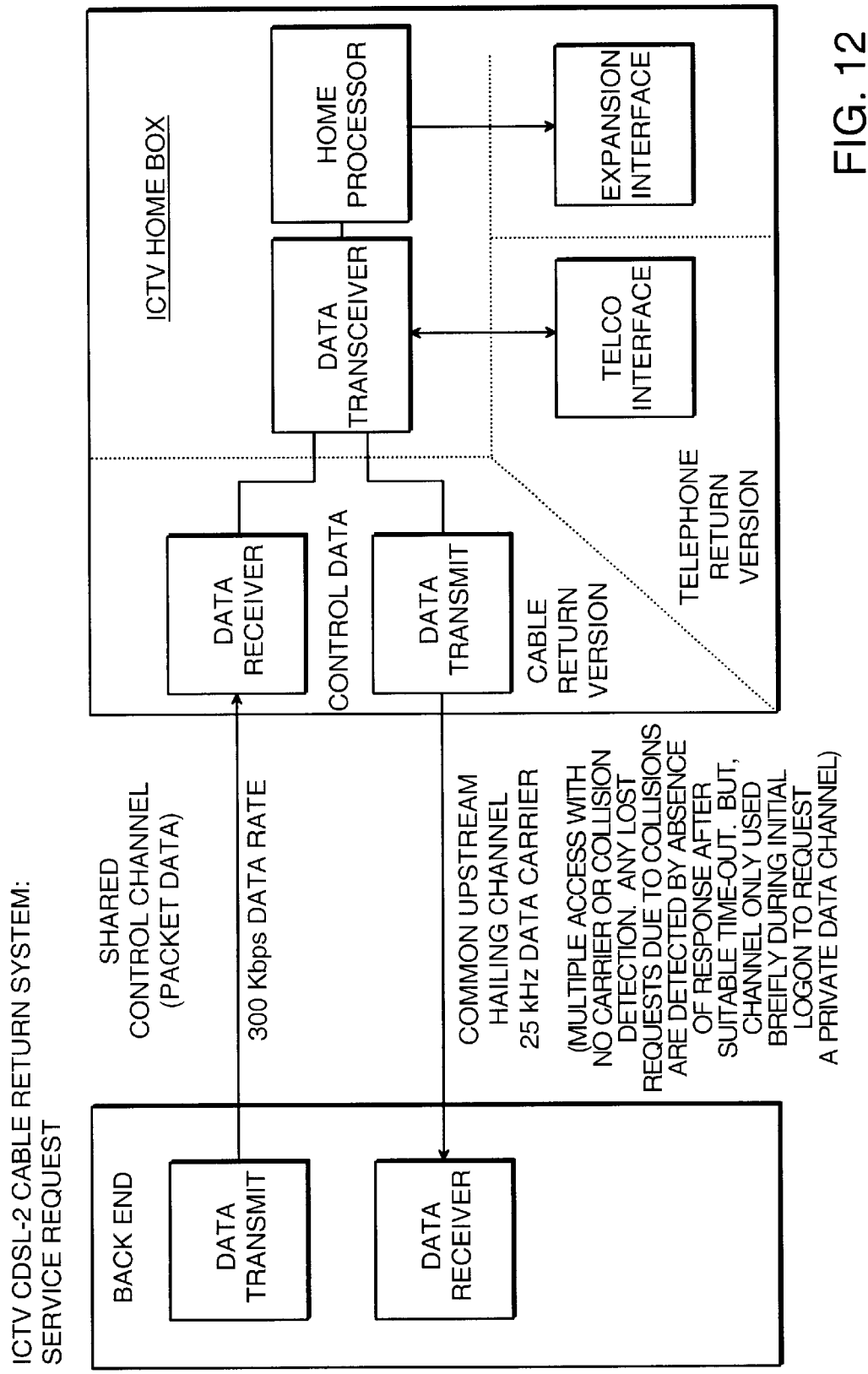
FIG. 12 is a high-level diagram of a home interface controller in communication with the back end.
Figure 13:
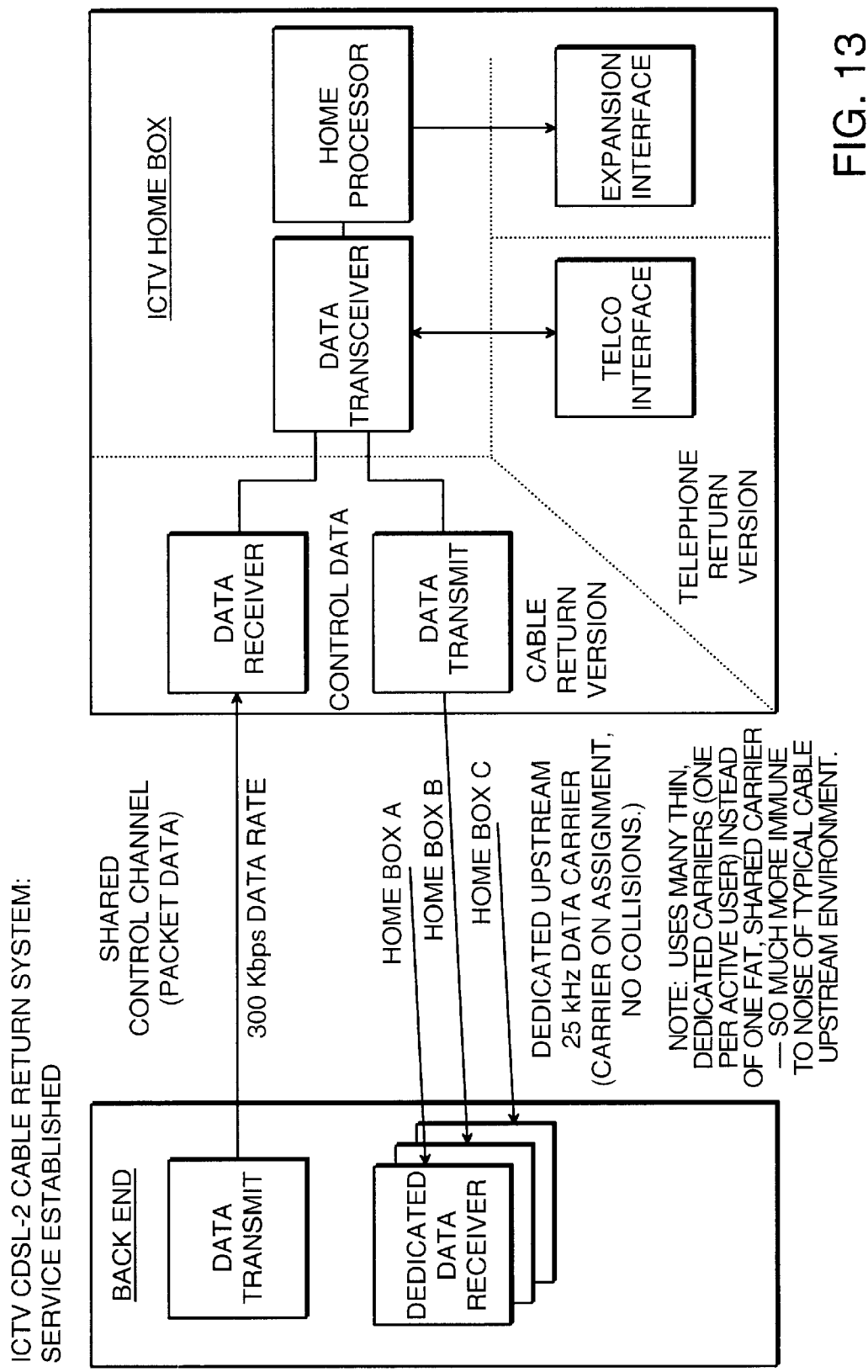
FIG. 13 is a high-level diagram illustrating a cable return system.

FIG. 12 shows a high-level diagram of the home interface controller in communication with the back end. In this embodiment, downstream data is in the form of packet data on a 300 Kbps data channel. When providing upstream data, the home interface controller uses a dedicated upstream channel requiring only a 25 kHz bandwidth for each home interface controller, so as to provide noise immunity. FIG. 12 is similar to FIG. 11, except that a common upstream channel is used by all the home interface controllers for hailing the back end. No carrier or collision detection algorithms are employed, but rather, any lost requests due to collisions among the home interface controllers are "detected" by an absence of response from the back end after a suitable time-out. This common upstream channel is used only briefly during an initial log-on to request a private data channel, where the private data channel is indicated in FIG. 13. As an alternative to the use of a hailing channel, the system manager may include an arrangement for the periodic broadcast, from the headend over a downstream portion of the data link to the home interface controllers, identifying of available channels; in this embodiment, each home interface controller has a rule for picking one of the available channels for use by the transmitter of its data transceiver.

Figure 14:
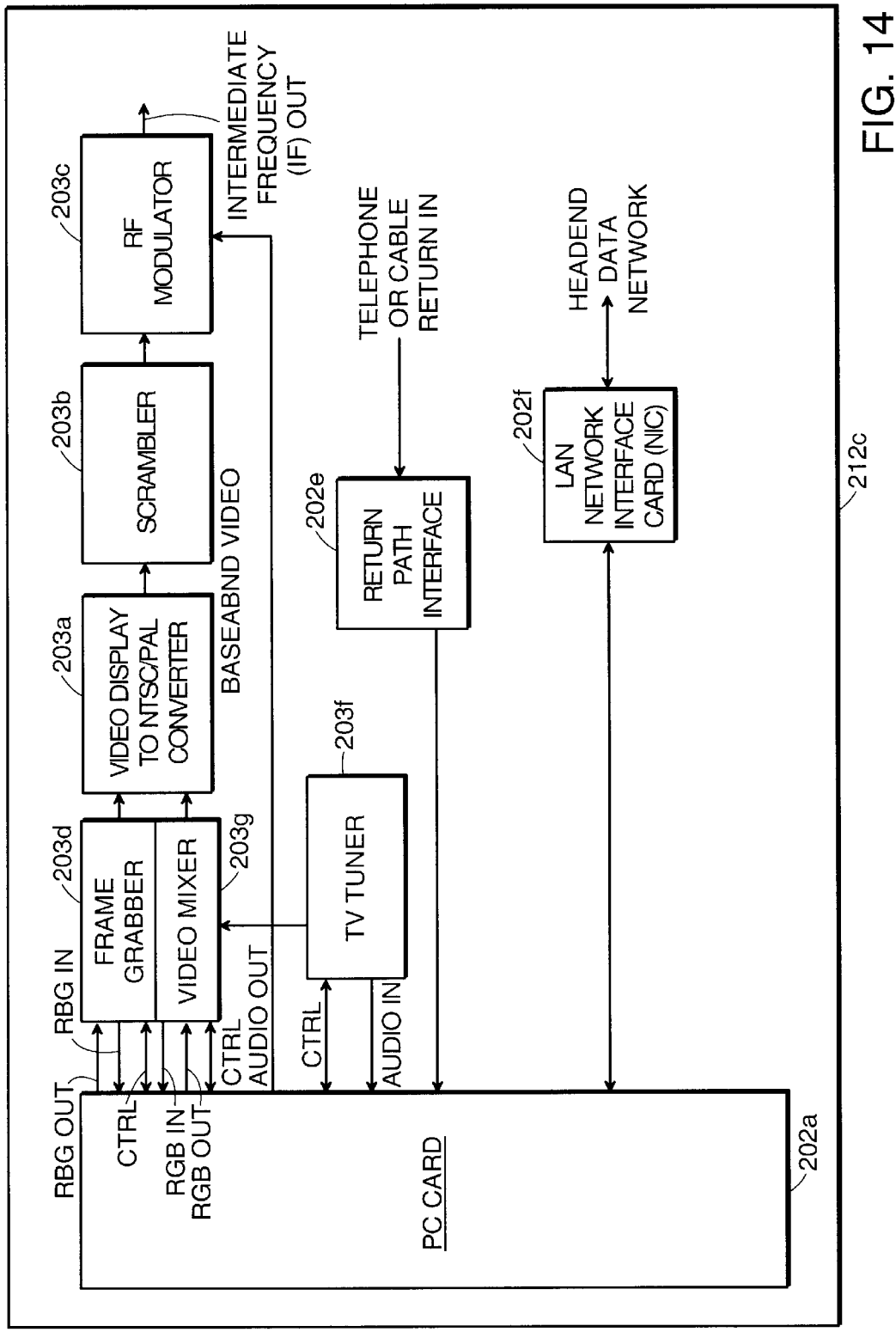
FIG. 14. is a block diagram of an analog user service module of an embodiment of the invention.

FIG. 14 shows a block diagram of an alternative embodiment of the analog user service control module 212b including a frame grabber 203d and a TV tuner 203f which produces an analog television signal. At the request of a subscriber, control data may be directed to the PC card 202a via the distribution switches 201 for requesting a frame of video from a television signal, a Uniform Resource Locator (URL) from a World Wide Web page in the Internet, or even an e-mail address from a television information signal to be saved in a storage medium 220. The storage medium in a preferred embodiment is a digital storage medium coupled to the PC card 202a via the distribution data switches 220 such as a hard drive, an optical storage media such as a recordable CD-rom disk or a removable data diskette, such as the Jaz and Zip drive diskettes from Iomega Corporation. The storage medium is accessible system wide. The TV tuner 203f is coupled to the frame grabber 203d. As control information is received by the PC card 202a, a signal is sent to the frame grabber 203d, indicating the frame of video to be extracted, typically the current frame or a portion thereof. The frame grabber 203d may receive television signals from the TV tuner 203f, or signals from the back end 11 encompassing other services such as E-mail and Internet access. Once the frames isolated by the frame grabber 203d, the processor sends it to the storage medium for later recall by the subscriber. The processor attaches address information to the frame identifying the subscriber making the storage request. A subscriber may request immediate access to the grabbed frame bypassing the storage medium. For example, a subscriber might be watching a sporting event and wish to freeze a frame of video as an important play unfolds. In such a situation, the subscriber indicates through the selection device that the frame is for immediate retrieval and once the frame is extracted by the frame grabber in its analog form it is transmitted directly to the home interface controller for display on the subscriber's television.

If requested by a subscriber the frame grabber 203d may be used to retrieve and store multiple frames, so that a video clip may be saved from the television signal or from other sources from the back end 11.

In an alternative embodiment, the TV tuner 203f is coupled to a video mixer 203g and the video mixer 203g has an output which leads to the input of the frame grabber 203d. The video mixer 203g has multiple inputs which may receive multiple video signals from the TV tuner 203f or from other sources from the back end 11 in response to a subscriber's request. The video mixer 203g mixes multiple signals to produce a combined signal of the input. In one embodiment, video signals from a TV tuner and a World Wide Web (WWW) page may be superimposed so that the signal from the TV tuner overlays the WWW page. The combined signal may then be passed to the frame grabber 203d where the PC card 202a again, upon request, may save the frame from the frame grabber in the storage medium 220 route a signal indicating that the frame is to be extracted and saved for future recall.

The processor of the PC card 202a may be equipped so as to recognize characters in a video frame via optical character recognition (OCR) technology. Once a video frame is extracted by the frame grabber 203d and digitized by the processor, text may be recognized through the OCR process creating a character recognition output which then may be saved in the storage medium. The OCR version of a digital video frame is normally of a smaller digital storage size than the uncompressed video frame. This savings in frame size is useful in conserving storage space and is especially efficient if the subscriber only desires the text of a video frame, such as a URL address or E-mail address. The processor may be configured, so as to automatically recognize and store any URL address that is present in a video frame. In another embodiment the URL address of a WWW page may be stored in the vertical blanking interval of the output frame. In this embodiment, the OCR process automatically extracts the URL address from the vertical blanking interval for storage in the storage medium.

If a subscriber wishes to recall information that has been saved by the frame grabber, the user indicates his intention through the home interface controller by accessing controls on the subscriber selection device sending a signal to the head end which is directed to a PC card 202*a* assigned to the subscriber. The PC card 202*a* recalls the digital information from the storage medium 220 relating to the subscriber's request and processes the digital information for transmission in analog form. The PC card 202*a* further includes a video adapter card which transforms the digital information into a standard analog video display format such as video graphics array (VGA), super video graphics array (SVGA) or extended video graphics array (XVGA). The analog signal is then converted to a standard television format in the video display to NTSC/PAL converter 203*a* in the NTSC/PAL TV modulator 203. The NTSC/PAL TV modulator further includes a scrambler 203*b* and an RF modulator 203*c* for conversion to an information signal that can be transmitted to the requesting home interface controller and displayed on the television set of the subscriber.

In another embodiment in which the television signal is digital, the frame grabber may operate in a similar fashion to its analog counterpart without the need for transitioning the signal between analog and digital. A digital signal containing information from sources in the back end 11 which are transferred through the distribution data switches 201 to the PC card 202*a* such as a decoded MPEG movie, or WWW pages, or a digital television signal from the TV tuner may be directed through the frame grabber. In response to a request by a subscriber the frame grabber can isolate the requested frame and either store the frame to a digital storage medium or transmit the frame to the subscriber's home interface controller.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. An interactive television information system for use over an information service distribution network that delivers information services from a headend to subscriber televisions, the interactive television information system comprising:

a plurality of home interface controllers, each such home interface controller being associated with a subscriber television and having (a) a data transmitter, operative over a data communication path to the headend; and (b) a selection input for receiving signals from a subscriber selection device;

a processor, disposed at the headend and available to receive control data over the communication path from the data transmitter of a given home interface controller; and a frame grabber controlled by said processor in response to control data received from the given home interface controller, said frame grabber grabbing a selected frame of video input and producing an output frame.

2. The interactive television information system of claim 1 further comprising:

a storage medium in communication with said processor for storing the output frame.

3. The interactive television information system of claim 2 wherein the storage medium is a digital storage medium; and the output frame is a digital output frame.

4. The interactive television information system of claim 2, wherein the processor can:

retrieve the output frame from the storage medium in response to control data received from a given home interface controller requesting the output frame; and wherein the system further comprises:

a conversion module for converting the output frame into a television information signal and sending the television information signal over the information service distribution network to the given home interface controller.

5. The interactive television information system of claim 1 further comprising:

a video mixer controlled by said processor coupled to the frame grabber in response to control data received from the given home interface controller, said video mixer having a first television signal input and a second television signal input, said video mixer producing an output signal combining video received from the first television signal input with video received on the second television signal input to produce a television signal for displaying a video image in which the video from the second television signal input is overlaid on the video from the first television signal input.

6. The interactive television information system of claim 2, wherein the PC card further comprises:

a character recognition program for recognizing any text from the output frame and extracting the text creating a stored frame and sending the stored frame to the storage medium.

7. The interactive television information system of claim 6, wherein the character recognition program recognizes a URL address, and extracts the address into a URL frame and sends the URL frame to the storage medium.

8. The interactive television information system of claim 7 wherein the URL address is located in the vertical blanking interval of the output frame.

9. A method of grabbing a frame of video in an interactive television information system having an information service distribution network that delivers information services from a headend to one of a plurality of home interface controller each of which is coupled to a subscriber television, the method comprising:

requesting a video frame to be saved through one of the plurality of home interface controllers; grabbing the video frame with a frame grabber located at the headend in response to the request from the home interface controller; and sending the video frame to a storage medium located at the headend.

10. A method according to claim 9 further including the steps of:

detecting at the headend a request, from a home interface controller associated with one of the subscriber television sets, for an information service in an interactive mode;

controlling at a processor in the headend, in response to detection of the request, an interactive session with the requesting home interface controller;

providing an information signal responsive to the interactive session through the information service distribution network to the subscriber television set associated with the requesting home interface controller for display of an image produced by the information signal; and receiving data communications at the processor from the requesting home interface controller during the interactive session representative of commands interactive with the image on the associated subscriber television set.

11. A method of recalling a frame of video in an interactive television information system having an information service distribution network that delivers information services from a headend to one of a plurality of home interface controller each of which is coupled to a subscriber television, the method comprising:

receiving a request recalling a video frame from a subscriber selection device of a given home interface controller into a processor at the headend;

retrieving the video frame from a storage medium to the processor in response to the request;

transforming the video frame into a television information signal; and sending the television information signal to the given home interface controller.

12. A method according to claim 11 further including the steps of:

detecting at the headend a request, from a home interface controller associated with one of the subscriber television sets, for an information service in an interactive mode;

controlling at a processor in the headend, in response to detection of the request, an interactive session with the requesting home interface controller;

providing an information signal responsive to the interactive session through the information service distribution network to the subscriber television set associated with the requesting home interface controller for display of an image produced by the information signal; and receiving data communications at the processor from the requesting home interface controller during the interactive session representative of commands interactive with the image on the associated subscriber television set.

13. A method for providing stored video frames in an interactive service on a cable television system that distributes television signals from a cable headend over an information service distribution network to a plurality of subscriber television sets, said method comprising:

detecting at the cable headend a request, from a home interface controller associated with one of the subscriber television sets, for a stored video frame;

receiving at a processor in the headend, in response to detection of the request, the stored video frames as requested by the home interface controller;

converting the stored video frame to a television information signal;

providing the television information signal through the information service distribution network to the subscriber television set associated with the requesting home interface controller for display of the stored video frames.

14. A method of saving video frames in an interactive service on a cable television system that distributes television signals from a cable headend over an information service distribution network to a plurality of subscriber television sets, said method comprising:

detecting at the headend a request to save video frames from an information signal, from a home interface controller associated with one of the subscriber television sets;

controlling at a processor in the headend, in response to detection of the request, a frame grabber which grabs the requested video frames from the information signal; and transferring the requested video frames into a storage medium.

15. An interactive television information system coupled to a cable television system having (i) an information source means available at a headend for supplying a plurality of information services, and (ii) an information service distribution network, for delivering the information services in a television information signal to subscriber televisions, the system comprising:

a plurality of home interface controllers, one such home interface controller associated with each subscriber television, for providing an output in communication with the subscriber television and having (i) a signal output for television information signal and (ii) a data transceiver operative over a data communications link to the headend;

a plurality of subscriber selection devices, one device associated with each home interface controller and in communication with the data transceiver, for permitting subscriber interaction, wherein a subscriber may request a video frame from the television information signal to be saved in a storage medium; and a plurality of interactive controllers each having a frame grabber, disposed at the headend, each interactive controller (i) in television communication with the information source means and (ii) in assignable television communication over the network with an assigned home interface controller and (iii) in assignable data communication over the data communications link with the assigned home interface controller, so that the interactive controller furnishes the information service interactively over the network to the assigned home interface controller and its associated television and in response to a request to save a video frame causing the frame grabber to grab the requested frame and transfer the frame to the storage medium.

* * * * *